US011632320B2

(12) United States Patent
Castle et al.

(10) Patent No.: US 11,632,320 B2
(45) Date of Patent: Apr. 18, 2023

(54) CENTRALIZED ANALYTICAL MONITORING OF IP CONNECTED DEVICES

(71) Applicant: NetWolves Network Services, LLC, Tampa, FL (US)

(72) Inventors: Peter Castle, Tampa, FL (US); Robert Lane, Tampa, FL (US); Jared Womack, Tampa, FL (US); Tong Zhang, Tampa, FL (US)

(73) Assignee: NetWolves Network Services, LLC, Tampa, FL (US)

( * ) Notice: Subject to any disclaimer, the term of this patent is extended or adjusted under 35 U.S.C. 154(b) by 0 days.

(21) Appl. No.: 16/952,452

(22) Filed: Nov. 19, 2020

(65) Prior Publication Data

US 2021/0152455 A1 May 20, 2021

Related U.S. Application Data

(60) Provisional application No. 62/937,610, filed on Nov. 19, 2019.

(51) Int. Cl.
*H04L 43/10* (2022.01)
*H04L 43/0876* (2022.01)

(52) U.S. Cl.
CPC .......... *H04L 43/10* (2013.01); *H04L 43/0876* (2013.01)

(58) Field of Classification Search
CPC ....... G06F 11/30; H04L 43/10; H04L 43/0876
See application file for complete search history.

(56) References Cited

U.S. PATENT DOCUMENTS

| 9,331,907 | B1* | 5/2016 | Gerstenberger .... H04L 43/0882 |
| 9,740,363 | B2* | 8/2017 | Gasperi .............. G06F 11/3419 |
| 10,313,211 | B1 | 6/2019 | Rastogi et al. |
| 10,756,990 | B1* | 8/2020 | Chakkassery Vidyadharan .......... G06N 20/00 |
| 2003/0217357 | A1* | 11/2003 | Parry ........................ G06F 8/65 717/168 |
| 2007/0050777 | A1* | 3/2007 | Hutchinson ......... G06F 11/0781 718/104 |

(Continued)

OTHER PUBLICATIONS

International Search Report dated Feb. 17, 2021. Applicant: Netwolves Network Services, LLC, PCT Application No. PCT/US2020/061170 filed on Nov. 19, 2020.

(Continued)

*Primary Examiner* — Andrew C Georgandellis
(74) *Attorney, Agent, or Firm* — Shumaker, Loop & Kendrick, LLP; Jeffrey B. Fabian

(57) ABSTRACT

Disclosed are systems and methods for centralized monitoring of connected devices within a network. The system includes multiple dashboard graphical user interfaces ("Dashboards") that aggregate multiple monitoring platforms into a single interface. The Dashboards display a wide variety of critical system network monitoring metrics. The Dashboards are generated utilizing network monitoring data and metrics received from a virtual service engine platform deployed within a monitored network. The virtual service engine platform itself incorporates a multitude of monitoring software platforms and applications that capture a wide range of useful network monitoring metrics and data from the digital resources that comprise a monitored information technology network.

17 Claims, 11 Drawing Sheets

(56) References Cited

U.S. PATENT DOCUMENTS

2008/0209333 A1* 8/2008 Frei .................. H04L 41/22
                                                          715/736
2008/0209451 A1    8/2008  Michels et al.
2016/0127484 A1    5/2016  Hornor et al.
2016/0246490 A1*   8/2016  Cabral ............... G06F 3/0481
2017/0090723 A1*   3/2017  Baumecker .......... G06F 9/451
2017/0147425 A1*   5/2017  Waheed ............ G06F 11/3034
2018/0027058 A1    1/2018  Balle et al.
2018/0287902 A1   10/2018  Chitalia et al.
2021/0081541 A1*   3/2021  Simpson ............. G06F 21/572
2021/0092616 A1*   3/2021  Desai ................ H04L 41/22

OTHER PUBLICATIONS

Written Opinion dated Feb. 17, 2021. Applicant: Netwolves Network Services, LLC, PCT Application No. PCT/US2020/061170 filed on Nov. 19, 2020.

* cited by examiner

| User Application Settings |
|---|
| Maximum chart data rows / Non-Pivot |
| Maximum chart data rows / With Pivot |
| Maximum Chart Data Rows to Export |
| Default Date/Time Format |
| Default Number Format |
| Military Time Format |
| Dashboard Bookmarks Enabled |
| Dashboard Preview Images Enabled |
| Dashboard Preview Image Save Policy |
| Dashboard List - Display Mode |
| Dashboard List - Display Style |
| Dashboard List - Display Position |
| Dashboard List - Modifiable Display Mode |
| Dashboard List - Modifiable Display Style |
| Dashboard List - Modifiable Position |
| Dashboard List - Dashboard Search Enabled |
| Default Dashboard Transition |
| Prevent Session Timeout |
| Session Timeout (minutes) |
| Browser Alert Checks Enabled |
| Data Import - Maximum File Size |
| Case-Sensitive Filter Criteria |
| Viewer Role May Export |
| Viewer Role May View Diagnostics |
| Guest User May View Diagnostics |
| Magnifier Enabled |
| Mouseover Pie Analyzer Enabled |

FIG. 4

How can we help you today?

First name *
Last name *
Email address *
Phone
Question *

Submit

Your IT Support Specialist will contact you shortly.

Click here if you wish to use your local email client.

CENTRALIZED ANALYTICAL MONITORING OF IP CONNECTED DEVICES

CROSS REFERENCE TO RELATED APPLICATION

This application claims priority from U.S. provisional application No. 62/937,610 filed Nov. 19, 2019, the entirety of which is incorporated herein by reference.

TECHNICAL FIELD AND BACKGROUND

The present invention relates generally to the field of electronic system monitoring, and more particularly, to systems and methods that enable the monitoring and management of enterprise-wide of information technology networks.

Monitoring and management of information technology networks continues to become more challenging as the size and complexity of information technology systems have grown and as enterprises of all sizes have become increasingly more reliant on such networks for critical day-to-day operations. Effective network management commonly requires gathering and interpreting data from a large number of network nodes and devices that communicate using different protocols or that use varying data formats. Even modest size networks can include a wide range of devices to be managed and monitored from web servers, to laptops, smartphones, printers, network devices like routers or switches, or specialized equipment such as medical imaging devices. Moreover, effective network monitoring requires capturing and interpreting a diverse set of data metrics, such as network traffic information, software and hardware resource utilization, software and hardware resource availability, and network security threats.

From a personnel perspective, effective network management requires specialized knowledge relating to a significant number of topics, including information technology security, hardware setup and configuration, installation and operation of software applications utilized to perform critical business operations, data storage management, management of network traffic flow, and providing helpdesk support, among many other topics. Navigating such a wide range of specialized and technical topics is challenging for enterprises having only a small number of information technology personnel. Even for larger enterprises, diagnosing and resolving network problems can be inefficient and time-consuming where it requires coordinating information technology personnel from different departments having differing areas of expertise.

Considering the challenges inherent in modern day network management and monitoring, it is an object of the present invention to provide systems that enable the automated capture, analysis, and efficient display of a diverse range of data metrics and information relevant to network management across an enterprise. The disclosed systems and methods allow substantial amounts of critical information to be displayed in a single pane of glass (i.e., on a single screen) in a manner that is accessible and useful even to individuals without specialized knowledge. Information technology network health can be efficiently assessed, and problems can be identified and resolved quickly and proactively so that enterprises of various sizes can more effectively and expediently manage networks resources.

SUMMARY

Disclosed are systems for performing the centralized network monitoring of connected devices. The systems includes a virtual service engine Platform ("VSE Platform") that captures a variety of network monitoring data utilized in network monitoring and management, including, but not limited to, availability network monitoring data, utilization network monitoring data, security network monitoring data, function status network monitoring data, maintenance and support data, and performance network monitoring data. The network monitoring data is captured from system digital resources, such as compute nodes (e.g., server computing devices), network nodes (e.g., routers, switches, hubs, bridges, gateways, modems, wireless or wired access points, or other types physical or virtual computing devices that connect end point computing devices to a network), monitored software applications and services, and end point devices (e.g., computers, smart phones, or other electronic devices utilized by end users along with dedicated function devices like printers, scanners, and the like). The network monitoring data is used to determine network monitoring metrics that are output to end users on a Dashboard Graphical User Interface.

The VSE Platform can be implemented by a computing device integrated with the network to be monitored. The VSE Platform serves as a host to multiple virtual machines, or virtual service engines, that are dedicated appliances that perform specified network monitoring and management functions. The virtual service engines are referred to by the applicant using the proprietary name "Wolfpacs," which are also referred to herein as Functionality Modules. The virtual service engines themselves implement multiple software applications and software platforms that carry out the network monitoring and management functions.

The virtual service engines and associated software applications and platforms can include, but are not limited to: (i) a Platinum 1 Functionality Module that includes software for implementing a secure data connection, such as a virtual private network connection; (ii) a Router Functionality Module; (iii) a Firewall Functionality Module; (iv) a network traffic optimizer, or "WAN Optimizer," Functionality Module; (v) a Platinum 0 Functionality Module that captures network flow data and that implements a Secure Remote Monitoring and Management ("SRM2") Application Monitor software application that captures function status network monitoring data that is used to generate Business Critical Service metrics, as explained more fully below; (vi) a User Experience Engine/Monitoring Engine and a Polling Engine Functionality Module that in part implements a network monitoring software platform ("NMS Platform"); (vii) Polling Engine Functionality Module that in part implements the network monitoring software platform; and (viii) a Management Workstation Functionality Module. The virtual service engine can also include a Data Aggregation Database software platform that captures network monitoring data from the NMS Platform that is used to determine durational network monitoring metrics calculated over specified time periods. The Data Aggregation Database software platform can also capture security network monitoring data from various security software applications.

As part of capturing network monitoring data, the VSE Platform periodically transmits a network polling request message to one or more network nodes. The network polling request message includes computer-readable instructions that, when processed by the network nodes, causes the network nodes to transmit to the VSE Platform, utilization network monitoring data and availability network monitoring data that includes a network node operational status. Similarly, the VSE Platform can periodically transmitting a compute polling request message to one or more compute nodes. The polling request message can include computer-readable instructions that, when processed by the compute nodes, causes the compute nodes to transmit to the VSE Platform utilization network monitoring data and availability network monitoring data that includes a compute node operational status. The VSE Platform can also capture data from various monitored software applications running on a network by periodically transmitting an application polling request message to one or more monitored software applications The application polling request message includes computer-readable instructions that, when processed by the monitored software applications, causes the monitored software applications to transmit to the VSE Platform, availability network monitoring data that includes an application operational status.

The system also includes a dashboard server that generates an Ecosystem Overview Dashboard Graphical User Interface (GUI). The Dashboard GUI is configured for display on an end user computing device display screen such that multiple network monitoring metrics, as determined from the availability network monitoring data and the utilization network monitoring data, are displayed on a single integrated interface. The network monitoring metrics can include a network node availability network monitoring metric, a compute node availability network monitoring metric, a monitored software application availability network monitoring metric, a network node utilization network monitoring metric, and a compute node utilization network monitoring metric. The Dashboard GUI also displays a Node Map that shows the geographic location and operational status for the network nodes, the compute nodes, or both.

In another aspect of the system, the VSE Platform implements a Secure Remote Monitoring and Management (SRM2) Application Monitor software application that is configured to capture network monitoring data used to determine the Business Critical Services metrics. More particularly, the SRM2 Application Monitor software application transmits a status function check message to a digital resource. The status function check message includes a computer-readable instruction that, when executed by the digital resource, causes the digital resource to perform a specified function and generate function status network monitoring data. The functions can include typical operational functions of the digital resource, such as sending an email for an email exchange server or email software application or printing a document for a printer. The function status network monitoring data includes an identifier for the digital resource and a digital resource operational status that indicates whether the digital resources is operating properly and whether the function implemented by the instruction in the status function check message was successfully performed by the digital resource. The function status network monitoring data is transmitted to the VSE Platform. The function status network monitoring data is then used to determine one or more Business Critical Service metrics. The dashboard server configures the Ecosystem Overview Dashboard GUI to display the Business Critical Service metrics, which can include a digital resource identifier and a digital resource operational status.

In one embodiment, the VSE Platform implements the Firewall Functionality Module that generates security network monitoring data. The Firewall Functionality Module operates as a firewall software application on the monitored network to screen incoming data packets to recognize threats, among other functions, as explained in more detail below. The security network monitoring data is utilized to determine security network monitoring metrics that can include, for example, a Current Security Risk, Blocked Malware Instances, Blocked Websites, and one or more metrics relating to Potential Hazardous Users (e.g., a count of the number of potentially hazardous end users). The dashboard server can generate a Security Summary Dashboard GUI that is configured to display, within a single integrated interface, multiple security network monitoring metrics.

The system can also display maintenance and support metrics determined from identification and configuration data. The identification and configuration data is retrieved by the VSE Platform from the various system digital resources and can include, for instance, serial or model numbers for equipment, information concerning the type of equipment (e.g., a router, tablet computer, etc.), identifiers or version/software build numbers for installed software, service dates when the digital resource was activated, among other relevant information. The VSE Platform can capture the identification and configuration data by transmitting a get request message to one or more digital resources. The get request message includes computer-readable instructions that, when processed by the digital resource, causes the digital resource to transmit to the VSE Platform identification and configuration data. The VSE Platform then queries a maintenance database using the identification and configuration data to retrieve maintenance and support data corresponding to the digital resource, such as whether the manufacture is providing software or other updates for the digital resource or whether the digital resource is beyond or nearing the end of a maintenance cycle. The dashboard server configures the Ecosystem Overview Dashboard GUI to display the maintenance and support metrics as part of a single integrated interface. The maintenance and support metrics can include an End of Support Devices metric and an Expired Maintenance Devices metric that show the number and/or identifiers for digital resources that are nearing or beyond the end of a support life or maintenance cycle.

In yet another feature, the VSE Platform determines durational network monitoring metrics using the network monitoring data. That is, the VSE Platform utilizes the historical or aggregated network monitoring data received in response to the polling request messages to determine network monitoring metrics over specified time periods, such as the last twenty-four hours, seven days, or thirty days. More specifically, the VSE Platform determines (i) a durational network node availability network monitoring metric based on the availability network monitoring data received by the VSE Platform in response to the periodically transmitted network polling request message, (ii) a durational compute node availability network monitoring metric based on the availability network monitoring data received by the VSE Platform in response to the periodically transmitted compute polling request message, (iii) a durational monitored application availability network monitoring metric based on the availability network monitoring data received by the VSE Platform in response to the periodically transmitted application polling request message, (iv) a durational network node utilization network monitoring metric based on the utilization network monitoring data received by the VSE Platform in response to the periodically transmitted network polling request message, and (v) a durational compute node utilization network monitoring metric based on the utilization network monitoring data received by the VSE Platform in response to the periodically transmitted compute polling request message. The dashboard server configures the Ecosystem Overview Dashboard GUI to display, within the single integrated interface, the durational network monitoring metrics.

In one embodiment, the system can include a core application server, a database cluster, and a reporting server. The VSE Platform determines the network monitoring metrics based on the availability network monitoring data and the utilization network monitoring data. The VSE Platform establishes a secure data connection to the core application server and transmits the network monitoring metrics to the core application server through the secure connection. The core application server subsequently transmits the network monitoring metrics to the database cluster for storage. To alleviate the load placed on the database cluster, a reporting server periodically retrieves the network monitoring metrics and transmits the network monitoring metrics to the dashboard server.

With regard to specific metrics, the network node availability network monitoring metric may include a percentage of network nodes for which the network node operational status indicates that the network node is functioning properly and available for use. The compute node availability network monitoring metric can be a percentage of compute nodes for which the compute node operational status indicates that the compute node is functioning properly and available for use. The monitored software application availability network monitoring metric can be a percentage of monitored software applications for which the application operational status indicates that the monitored software application is functioning properly and available for use. And the network node utilization network monitoring metrics can include a percentage of received data bandwidth utilized and a percentage of transmission data bandwidth utilized. Finally, the compute node utilization network monitoring metrics can include a percentage of CPU utilization and a percentage of memory utilization.

In another embodiment, a system for centralized monitoring of connected devices includes a digital resource inventory relational database where each database record includes a digital resource identifier for digital resources within the monitored network. The system also includes a virtual service engine that periodically transmits a polling request message to one or more digital resources within a monitored network. The polling request message includes computer-readable instructions that, when processed by the digital resources, causes the digital resources to transmit to the virtual service engine utilization network monitoring data and availability network monitoring data that includes a digital resource operational status. The virtual service engine determines one or more network monitoring metrics based on the availability network monitoring data and the utilization network monitoring data. The network monitoring metrics include a digital resource availability network monitoring metric and a digital resource utilization network monitoring metric.

The virtual service engine further establishes a secure data connection to a provider computing environment that includes a provider server. The virtual service engine then transmits the network monitoring metrics to the provider system through the secure data connection. The provider server generates a Dashboard Graphical User Interface and configures the Dashboard Graphical User Interface for display by an end user computing device display screen. The dashboard server further configures the Dashboard Graphical User Interface to display within a single integrated interface, the digital resource availability network monitoring metric and the digital resource utilization network monitoring metric as well as a list of digital resource identifiers retrieved from the digital resource inventory relational database.

The one or more digital resources can be network nodes, and the virtual service engine can include a Platinum 1 Functionality Module that captures network flow data. Specifically, the Platinum 1 Functionality Module transmits a netflow data request message to one or more network nodes. The netflow data request message includes computer-readable instructions that, when processed by the network node, cause the network node to transmit network flow data to the Platinum 1 Functionality Module. The virtual service engine determines one or more network flow monitoring metrics based on the network flow data and transmits the one or more network flow monitoring metrics to the provider system. The provider server configures the Dashboard Graphical User Interface to display (i) the network flow data, (ii) a Node Map that displays a geographic location and a digital resource operational status for the one or more network nodes, and (iii) an availability network monitoring metric and an utilization network monitoring metric for a given network node, when the given network node is selected from the list of digital resource identifiers. In other words, network monitoring data specific to a network node is displayed by selecting the node from a list on the Dashboard Graphical User Interface.

In another aspect of the system, the digital resources can be compute nodes, and the virtual service engine is configured to transmit a get request message to the one or more compute nodes. The get request message includes computer-readable instructions that, when processed by compute nodes, causes the compute nodes to transmit to the virtual service engine identification and configuration data. The identification and configuration data can include an identifier for at least one software application integrated with the one or more compute nodes. The provider server configures the Dashboard Graphical User Interface to display (i) a Node Map that shows a geographic location and the operational status for the compute nodes, (ii) a list of identifiers for the software applications integrated with the one or more compute nodes; and (iii) an availability network monitoring metric and an utilization network monitoring metric for a given compute node, when the given compute node is selected from the list of digital resource identifiers.

In a further aspect of the system, the digital resources are monitored software applications, and the virtual service engine includes a SRM2 Application Monitor software application to gather function status network monitoring data used to generate the Business Critical Services metrics. The SRM2 Application Monitor software application transmits a status function check message to a monitored software application. The status function check message incorporates a computer-readable instruction that, when executed by the monitored software applications, causes the monitored software application to perform a specified function and generate function status network monitoring data. The monitored software application transmits the function status network monitoring data to the virtual service engine.

The virtual service engine can also include a Monitoring Engine software application that interfaces with the one or more monitored software applications to generate software application performance data. The virtual service engine transmits the function status network monitoring data and the software application performance data to the provider system. The provider server configures the Dashboard Graphical User Interface to display (i) a Business Critical Services metric based on the function status network monitoring data, (ii) at least one software application performance metric determined based on the function status network monitoring data, and (iii) an availability network monitoring metric and an utilization network monitoring metric for a given monitored software application when the given monitored software application is selected from the list of digital resources. The software application performance metrics can include an application response time and a network response time, and the Business Critical Services metrics can include a software application identifier and an operational status.

Also disclosed is a method for centralized monitoring of connected devices that is performed by various software application components. The method includes the step of periodically transmitting, by a network monitor software (NMS) Platform, a network polling request message to one or more network nodes. The network polling request message includes computer readable instructions that, when processed by the network nodes, causes the network nodes to transmit to the NMS Platform (i) utilization network monitoring data, and (ii) availability network monitoring data that includes a network node operational status. The method also includes the step of periodically transmitting, by the NMS platform, a compute polling request message to one or more compute nodes. The compute polling request message also includes computer-readable instructions that, when processed by the compute nodes, causes the compute nodes to transmit to the NMS Platform (i) utilization network monitoring data, and (ii) availability network monitoring data that includes a compute node operational status. The NMS platform further periodically transmits an application polling request message to one or more monitored software applications that also includes computer-readable instructions that, when processed by the monitored software applications, causes the monitored software applications to transmit to the NMS Platform availability network monitoring data that includes an application operational status. The method includes generating by a dashboard server, a Dashboard Graphical User Interface. The Dashboard Graphical User Interface is configured to display within a single integrated interface, a multiple network monitoring metrics determined from the availability network monitoring data and the utilization network monitoring data. The network monitoring metrics can include one or more network node availability network monitoring metrics, one or more a compute node availability network monitoring metrics, and one or more monitored software application availability network monitoring metrics.

BRIEF DESCRIPTION OF THE DRAWINGS

Features, aspects, and advantages of the present invention are better understood when the following detailed description of the invention is read with reference to the accompanying figures, in which:

FIG. 4 illustrates available User Application Settings.

FIG. 7 illustrates an example RMAC submission form for submitting a support request.

FIG. 10 illustrates an example Compute Node Summary Dashboard graphical user interface.

DETAILED DESCRIPTION

Figure 1:
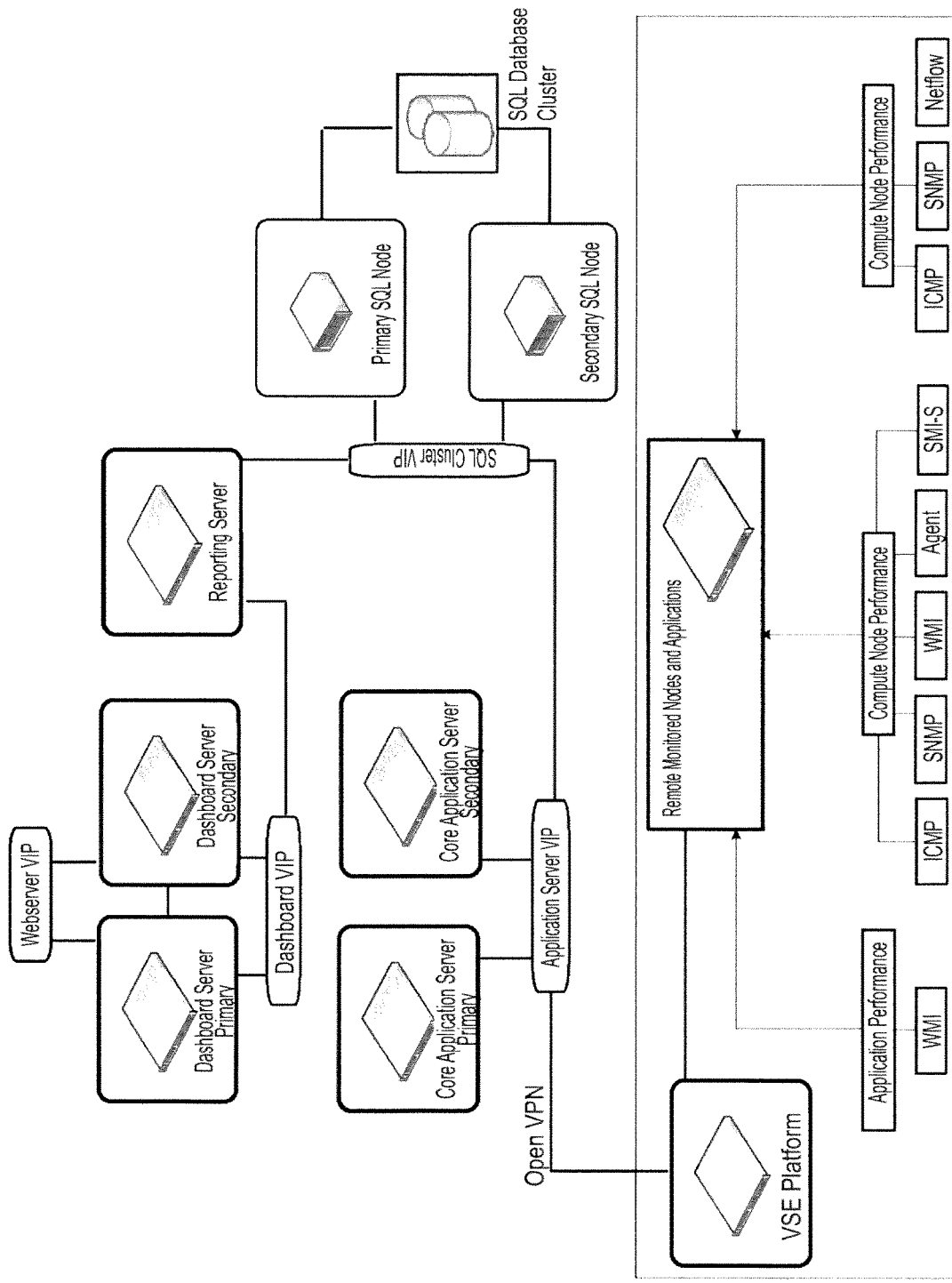
FIG. 1 is an exemplary system diagram according to one embodiment.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art.

The nomenclature utilized to designate various devices and software applications is not intended to be limiting, and reference to a device or application with a particular commercial, proprietary, or other name can be construed to encompass other devices and applications that perform a similar function or have a similar structure. As an example, reference to the Windows® Management Instrumentation software standard is not intended to be limiting and should be construed as a reference to other types of software and standards that provide an operating system interface through which computing system components provide monitoring data, notifications, and other information relevant to monitoring the component.

As used herein, the term "provider" generally describes the person or entity providing an information technology network monitoring platform as a service and/or providing technical "helpdesk" support services. The terms "client" or "customer" is used to generally denote a separate business entity from the provider that utilizes the information technology network monitoring platform services. The terms "end user" or "user" refers to individuals associated with the customer who utilize the customer's information technology network and other digital resources to perform the customer's business operations and who interface with the network monitoring platform in utilizing the services offered by the provider.

The term "digital resources" generally refers to physical and virtual computing devices, including, but not limited to, network type devices (e.g., routers, switches, hubs, bridges, gateways, modems, wireless or wired access points), end user devices (e.g., laptops, tablets, smartphones), and servers (also called "compute nodes"), as well as to various software applications, software services, software processes, and software platforms utilized by a customer in performing its business operations.

The terms "software application" or "application" is intended to generally refer to end user managed software (e.g., mobile apps, word processing software, email interface, etc.) as well as software services managed for users and used by software applications (e.g., background software processes that interface with an operating system and various software applications or automated software having no user interface). Software applications may incorporate on one or more "software processes" or "software modules" that perform discrete tasks in furtherance of the overall operations performed by a software application. The term "software platform" is used to refer generally to a collection of related software applications, software processes, software modules, and/or software services that perform a multitude of operations and functions that are often directed to accomplishing a related set of objectives.

The terms network monitoring data and network monitoring metrics are used to generally refer to computer generated data, statistics, and information that is captured from information technology network digital resources and third-party sources that is used in network monitoring and maintenance activities to analyze the overall performance, status, security, and health of information technology network digital resources and the information technology network in general. The inventive systems described herein capture and analyze a substantial number of categories of network monitoring data and network monitoring metrics, which include, but are in no way limited to, network flow data, digital resource availability network monitoring data, digital resource network monitoring utilization data, digital resource operational status data, and security network monitoring data.

The terms network monitoring data and network monitoring metrics are generally used interchangeably, but the term network monitoring metrics is at times used herein to refer to the subset of network monitoring data that is displayed to end users and that may be derived from analysis and processing of network monitoring data. To illustrate with a simplified example, a node might generate utilization network monitoring data indicating the node's memory utilization stands at fifty percent, which is output to a user interface as an utilization network monitoring metric. In other cases, each one of a collection of five nodes might generate utilization network monitoring data indicating that each node has a different memory utilization percentage. In that case, the average memory utilization across all five nodes is calculated as average utilization network monitoring data and output to an end user interface as an average utilization network monitoring metric.

Overview

Disclosed are systems and methods that provide a high-level management or "C-suite" view into an information technology network ("IT network" or "network"). The systems and methods provide Dashboard graphical user interfaces ("GUIs") that aggregates multiple monitoring platforms into a single interface or single "pane of glass." The Dashboard GUIs displays a wide variety of critical system network monitoring metrics without the need for significant click-depth focus. That is, the need for user inputs to view the data is minimized so that network monitoring metrics are more accessible, which allow users to focus attention on high-level metrics and root causes of potential problems.

The Dashboard GUIs are generated by provider dashboard servers utilizing network monitoring metrics and data received from a virtual service engine platform ("VSE Platform") deployed within a customer's network. The VSE Platform itself incorporates a multitude of monitoring software platforms and applications that capture a wide range of useful network monitoring metrics and data from the digital resources that comprise the customer's information technology network.

System Architecture

As shown in FIG. 1, an example provider system configuration according to one embodiment includes: (i) a core application primary server; (ii) a core application secondary server; (iii) a dashboard primary server; (iv) a dashboard secondary server; (v) a reporting server; (vi) a primary Structured Query Language ("SQL") node connected to a SQL database cluster; (vii) a secondary SQL node connected to a SQL database cluster; (viii) virtual service engine platform; and (ix) remote monitored nodes and applications. The core application servers, dashboard servers, and SQL nodes shown in FIG. 1 rely on virtual Internet Protocol ("VIP") addressing and are configured for high availability active/passive functionality where one server is active, and the second server is passive (i.e., on standby) to provide failover functionality and fault tolerance. The VIP functionality allows multiple devices (e.g., the active (primary) device and the passive (secondary) device) to operate with a single IP address so that in the event of a failover, communications with other devices remains uninterrupted.

The core application servers process core software application functionality as well as web engines for the end users and the administrative console, as discussed in more detail below. The core application servers communicate with the VSE Platform to capture network monitoring data from the remote monitored nodes and applications that make up a customer's information technology network. The core application servers transmit the information to the SQL database cluster associated with the provider's system.

The reporting server receives the network monitoring data from the SQL database cluster and passes the data to the dashboard servers. The reporting server can enhance system operation by providing a secure, faster operating storage facility that periodically queries the SQL database cluster and stores the network monitoring data before transmission to the Dashboard Servers. The reporting servers control the flow of data from the SQL database cluster to avoid overloading the database cluster and diminishing performance. The dashboard servers process the network monitoring data from a customer's information technology network and generate the Dashboard GUIs for display over a web-based interface.

The provider system is connected through a Virtual Private Network ("VPN") to a customer's information technology network having an installed provider virtual service engine ("VSE") platform. The VSE Platform is deployed at a customer site to implement the required monitoring and security functions by capturing information from the remote and monitored nodes and applications. The VSE Platform captures network monitoring data from customer information technology network compute nodes (e.g., server computing devices), network nodes (e.g., routers, switches, hubs, bridges, gateways, modems, wireless or wired access points, or other types physical or virtual computing devices that connect end point computing devices to a network), and software applications and services. The customer end point computing devices are physical or virtual computing devices utilized by end users in performing customer enterprise operations, such as desktop computers, laptop computers, cellular smartphones, tablet computers, printers, medical equipment, manufacturing equipment, facility environmental control devices (e.g., air conditioning or power supply control), among many others. The VSE Platform is customizable to interface with the particular types and models of nodes, end point devices, and software applications and services that make up a customer's information technology network.

The present system utilizes an inventory or mapping of the nodes, end points, software applications, or other digital resources that make up a consumer's information technology network. The inventory of customer digital resources can be stored to a digital resource inventory relational database that includes identifiers for the nodes, end points, software applications, or other digital resources in a customer's network. The digital resource inventory relational database can include a wide variety of data and information that is associated with each identifier within the relational database, including, but not limited to, as Internet Protocol ("IP") addresses, media access control ("MAC") addresses, hardware model or serial numbers that identify the manufacture and type of device, a mapping of the networks and subnetworks to which the nodes and end point devices are connected, and an inventory of installed software applications and services, or geographic location data. The customer information technology network nodes, end point devices, and software applications can be mapped manually by entering customer digital resource data into a graphical user interface that stores the information to the digital resource inventory relational database.

The customer's network digital resources can also be mapped automatically by capturing and analyzing network traffic data to ascertain identifiers and other relevant information for customer digital resources that is then stored automatically to the digital resource inventory relational database. In some cases, the network or compute nodes include an integrated database, such as a management information base ("MIB"), that includes identification and configuration data, such as an IP address, port identifiers, an inventory of installed software and firmware, hardware serial numbers, and available storage space, among other types of information. Where available, the integrated MIB (or an equivalent) database can be retrieved by the system in connection with automatically creating a customer network inventory.

Some embodiments of the provider system can include Endpoint Accounting software that implements end point accounting and network inventory by periodically scanning for new devices that enter the proximity of, or that attempt to access, a customer's information technology network. Once the Endpoint Accounting software detects a new device, the Endpoint Accounting software captures information about the device, such as a MAC address and a device fingerprint (e.g., hardware serial numbers, installed software, etc.). The Endpoint Accounting software can also determine the geographic, physical, or virtual location on the customer's network the new device was detected by, for example, identifying the subnetwork or nearby nodes and associated geographic location data. The captured information is analyzed and, if necessary, compared against a database of known device fingerprint data to ascertain the type of device and accompanying software and a location of the new device.

The automated detection and identification of new devices by the Endpoint Accounting software allows the provider system to generate an alert to a customer end user that provides notice that a new device was detected and where on the network the new device was detected. In this manner, a customer can evaluate a potential threat posed by the device, decide to permit the device on the network, conduct a further investigation, or implement rules concerning protocols for blocking or permitting newly detected devices to access the customer's network.

The Endpoint Accounting software can be configured to recognize a variety of device types that come into proximity with or attempt to access a customer's network, such as a smartphone carried by a visitor to a customer's facility or an Internet of Things ("IOT") device newly installed at a customer facility like a "smart" light switch or a wireless inventory scanner. This has a particular advantage as the use of mobile devices and IOT devices has proliferated because customer network device and software application inventories are constantly changing, and such devices at times present vulnerabilities in the form of potential network access points that must be secured. Thus, effective network monitoring is promoted by the ability to quickly recognize new devices so that appropriate network access controls and monitoring protocols can be established.

The present inventive systems also include databases and Application Programming Interfaces ("APIs") that enable the systems to normalize or "wash" monitoring data and other information captured from a customer's network. Customer information technology networks include nodes, end point devices, and software applications created by different manufacturers and vendors that utilize different data formats, variations of standard protocols, and differing terminology. These variations between devices and software applications are mapped so that provider APIs can normalize the network monitoring data for display on the Dashboard GUIs. For example, some devices may report a fault with an alert that includes text describing the fault, such as a software process being "offline." In other cases, a device might simply report an alert with a status code that must be deciphered to ascertain whether the status is a fault condition, and if so, the precise fault being reported, such as a software process being "failed." The alert text describing a process as "offline" can be mapped to the status code and the status of the process being "failed." Once the variations are mapped, such alerts can be displayed in a consistent format using consistent terminology on the Dashboard GUIs.

Figure 2:
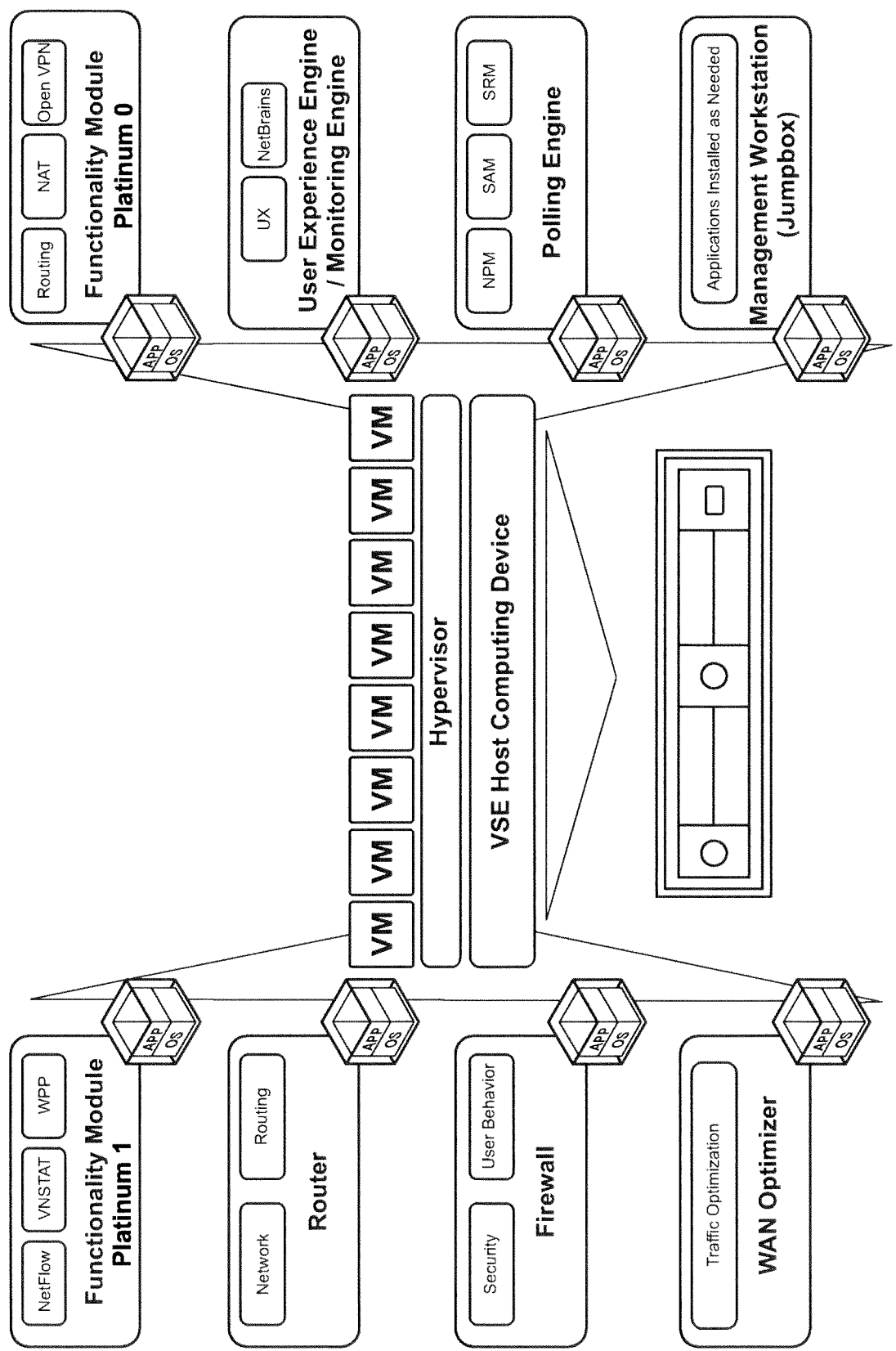
FIG. 2 illustrates an example virtual service engine platform configuration.
Figure 3:
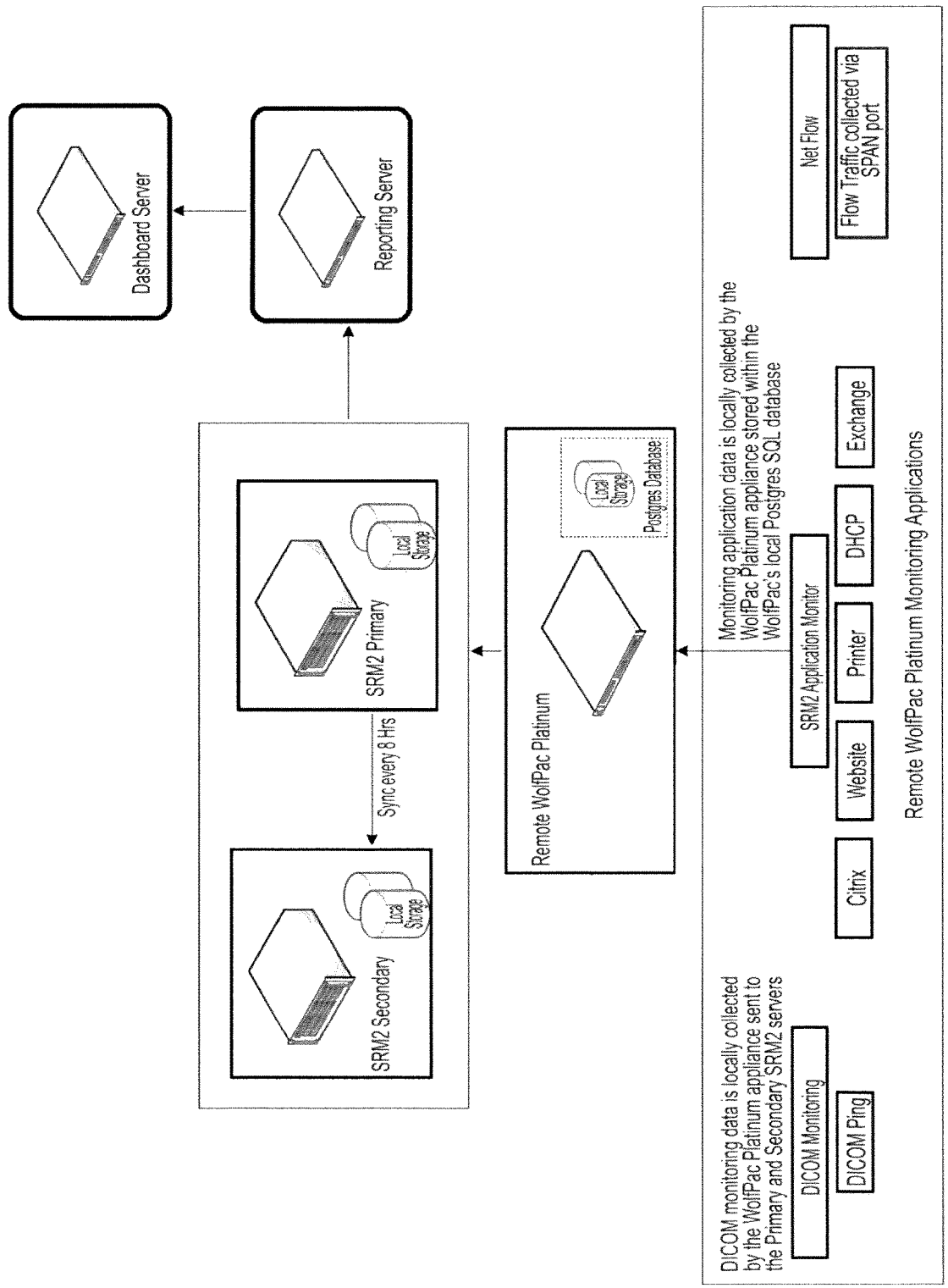
FIG. 3 illustrates an example configuration for a secure remote monitoring and management platform.

Once an inventory of customer digital resources is created and a map of the customer network established, the VSE Platform is utilized to poll the customer's network and capture relevant monitoring data. An example VSE Platform is depicted in FIG. 2 and includes one or more physical host computing devices. The host computing devices include integrated hypervisor middleware/firmware applications that enable the implementation of one or more virtual service engines that run as guest virtual machines ("VMs") on the host computing device. The VSEs in turn each implement a Wolfpac software package, or Functionality Module, which is a virtual appliance that is configured to provide a targeted set of functions that can be delivered to customers on-demand so as to more effectively manage system computing, storage, and other network resources.

The Platinum 1 Functionality Module shown in FIG. 2 provides functions such as capturing network monitoring data that includes network flow data ("Netflow" as shown in FIG. 1) and Business Critical Services data. Network flow data includes information relating to the flow of data across a customer's network, such as the identity of devices that transmit and receive data, the volume of data transmitted or received by particular devices, the time when data was transmitted or received, trends in data flow (e.g., increases or decreases of data transmission by particular devices), the identity of end point devices that are consuming the most or least network bandwidth, or other useful network flow metrics known to one of skill in the art. The network flow data can be captured by sending netflow data request messages to one or more network nodes that include instructions that cause the network nodes to return network flow data.

In some embodiments, the network flow data is first transmitted from the Platinum 1 Functionality Module to a Netflow Collection and Forwarding Server (not shown in FIG. 1) before being transmitted to the Core Application Server. The Netflow Collection and Forwarding Server is useful in some cases to format the network flow data in a manner that is more accessible when stored to the SQL database cluster.

The Platinum 1 Functionality Module also captures Business Critical Services data utilizing an integrated Secure Remote Monitoring and Management ("SRM2") Application Monitor software application. Business Critical Services data is enriched data captured according to customer defined parameters that extends beyond merely indicating whether a device or application is online or offline. To capture Business Critical Services data, the Platinum 1 Functionality Module, through the SRM2 Application Monitor software application, interfaces with a customer system resource to obtain device or application specific data. The Platinum 1 Functionality Module transmits status function check message to selected customer network digital resources that includes a command or instructions executed by the digital resource. The digital resource executes the instructions to perform a particular function and generates function status network monitoring data (also called Business Critical Services data) that is reported to the SRM2 Application Monitor software application running on the Platinum 1 Functionality Module. The function status network monitoring data is used to determine the Business Critical Services metrics.

To illustrate, instead of determining only whether a printer device is online or offline, the Platinum 1 Functionality Module SRM2 Application Monitor software application interfaces with the printer by transmitting a status function check message with instructions to perform a test print job. The SRM2 Application Monitor software application receives function status network monitoring data in return indicating whether the print function was successfully performed. As another example, rather than determining only whether a medical imaging machine is online or offline, the Platinum 1 Functionality Module can transmit a status function check message that includes instructions and test image data to the imaging machine, and the imaging machine can return function status network monitoring data indicating whether the imaging machine is capable of processing a particular image format. In yet another example, the Platinum 1 Functionality Module can transmit a status function check message to an email exchange server that includes instructions for the server to send a test email, and the email server can return a function status network monitoring data indicating whether the email transmission was successful. In this manner, customers are provided with enriched data concerning the status of customer nodes and end point devices that allows customers to more quickly and accurately recognize and diagnose problems and implement solutions.

Turning again to FIG. 2, the Router component of the VSE Platform can be implemented as a virtual router that provides gateway or routing services that allow the VSE Platform to interface with the customer network when the customer network is not configured to provide the required gateway or routing functions. The Wide Area Network ("WAN") Optimization Functionality Module is optionally provided to enhance data transfer efficiency (e.g., improved throughput, bandwidth, or latency) across a customer's network using techniques such as deduplication, compression, latency optimization, caching frequently used data, or protocol spoofing.

The Firewall Functionality Module can be deployed outside of a customer network to provide firewall security features such as packet filtering, user behavior monitoring, or circuit-level gateway management (i.e., verifying the validity of connections between devices at the transport layer against a table of permitted connections before a connection can be opened and data exchanged). The Firewall Functionality Module can also be deployed behind a customer's current firewall as an additional layer of security and to provide notice if a security threat has penetrated the existing customer firewall. In one embodiment, the Firewall Functionality Module is implemented by, for example, a Next Generation Firewall provided by Palo Alto Networks, ® Inc. The Firewall Functionality Module generates security network monitoring data concerning, for example, the number of blocked malware attacks, blocked websites, potentially hazardous end users and end user devices, identified correlated threats detected, and spyware installations detected.

The Platinum 0 Functionality Module shown in FIG. 2 provides a Virtual Private Network ("VPN") server that is configured to automatically "call home" by opening a VPN tunnel to communicate with the provider system with minimal or no changes to the security settings of a customer system. The Platinum 0 Wolfac optionally includes additional capabilities, such as: (i) a Keepalive Package software application that transmits periodic messages to other computing devices to check the availability of a connection or prevent the connection from timing out; and (ii) a custom Backup Script software application that runs from a cron job software utility (i.e., a software utility that periodically implements specified software commands) to keep the primary core application server in sync with the secondary core application server. The Platinum 0 Functionality Module can be configured to utilize Border Gateway Protocol to keep routing tables updated between the VPN server, VPN clients on a customer network, and the provider system.

The User Experience ("UX") Engine/Monitoring Engine ("Monitoring Engine") Functionality Module implements a monitoring probe that captures network monitoring data that is relevant to defining an end user's point of view in utilizing a customer network. Such network monitoring data is commonly related to the performance of monitored software applications utilized by end users. This can include gathering network monitoring data such as: (i) monitored software application response times; (ii) the length of time required for monitored software application data to flow across a customer network and whether any latency is observed; (iii) the identity of nodes, end user devices, or software applications causing any latency; and (iv) monitored software application errors. The network monitoring data captured by the Monitoring Engine can be useful for diagnosing whether any latency or errors are specific to a particular user or rather observed at the subnetwork or network level and at what layer any problems are observed (e.g., network layer, application layer, etc.). The Monitoring Engine can utilizing polling by sending periodic polling messages to network digital resources, including network nodes, compute nodes, and monitored software applications. The polling request messages include instructions that cause the digital resources to return network monitoring data, such as availability or utilization network monitoring data.

The Remote Polling Engine Functionality Module ("Polling Engine") commonly captures network monitoring data relevant to monitoring and evaluating the performance of a customer's information technology network at layers other than the application layer (e.g., physical layer, network layer, or transport layer). The Polling Engine implements data polling behind a customer's firewall utilizing protocols such as Simple Network Management Protocol ("SNMP"), Internet Control Message Protocol ("ICMP"), Windows Management Instrumentation ("WMI"), and Common Information Model ("CIM"). The network monitoring data captured by the Polling Engine is utilized in monitoring, among other things, network resource usage, performance, computing device and application inventory, network health, behavior, and capacity, and Storage Area Management data. The Polling Engine can also utilize polling request messages that are periodically sent to digital resources with instructions that cause the digital resources to return network monitoring data, such as availability or utilization network monitoring data.

The Monitoring Engine, Polling Engine, and Platinum 1 Functionality Module are deployed on a customer's network and are configured to feed network monitoring data to the provider system for display on the web-based Dashboard GUIs. The Monitoring Engine, Polling Engine, and Platinum 1 Functionality Module implement one or more software applications and software platforms that facilitate the capture and analysis of network monitoring data, including: (i) the DeathStar, or Data Aggregation Database software platform; (ii) a network monitor software platform ("NMS" or "NMS platform"); and (iii) a Secure Remote Monitoring and Management ("SRM2") software platform.

The Management Workstation Functionality Module provides "jumpbox" functionality that allows a provider end user to connect to the VSE Platform and the customer's network. Enabling a connection point to a customer's network allows provider agents or representatives to more efficiently perform remediation activities in response to a support request from a customer. As an example, if a customer end user is experiencing difficulty performing a particular function, such as sending an email, a provider agent can utilize the jumpbox to access the customer network and replicate the function (e.g., sending an email) to better diagnose problems.

Those of skill in the art will appreciate that these examples of possible virtual service engines are not intended to be limiting, and other dedicated virtual service engines can be integrated with the VSE Platform that serve dedicated functions. Additionally, the individual virtual service engines can implement other software applications and services used in network monitoring and management, or a combination of virtual service engines can implement one or more software applications and services used in network monitoring and management.

Capturing Monitoring Data

The Monitoring Engine and the Polling Engine function together to implement the NMS platform, which is the primary technology through the network monitoring data is gathered. The NMS platform utilizes multiple software application modules, including a: (i) Network Performance Manager ("NPM") software module; (ii) Network Configuration Manager; (iii) Server and Application Monitor ("SAM"); and (iv) Storage Resource Manager ("SRM").

The NPM software module gathers real-time performance metrics for both physical and virtual network nodes and end point devices. The NPM software module is designed to identify, diagnose, and resolve network related issues. The NPM software module periodically polls customer network nodes to request Central Processing Unit ("CPU") or "Compute" utilization data, availability network monitoring data that includes an operational status, network traffic flow data, memory usage data, and storage utilization data, among other types of other network monitoring data. The NPM software module relies on the SNMP protocol to capture relevant network monitoring data using a User Data Program ("UDP") communication protocol. An agent software module is integrated with the nodes or other managed devices and responds to requests from a manager module by making data available from the node's MIB. The NPM software also supports the use of ICMP to request network monitoring data, such as error messages or operational information indicating success or failure when communicating with another device, and the use of other protocols such as WMI and CIM.

The Server and Application Manager software module captures network monitoring data from the servers and computing devices that run software applications utilized by end users of a customer. The Server and Application Manager software module provides data at the application level of the customer network environment and captures monitoring data such as communication response times, CPU or Compute utilization, and data input/output rates. The Server and Application Manager software module can be configured to monitor individual software applications (i.e., monitored software applications) and generate alerts when an application becomes inoperable or enters a critical state, as indicated by a reported warning or change in operational status.

The Storage Resource Manager software module monitors data relating to pools or arrays of storage devices. The Storage Resource Manager software module can transmit periodic storage data request messages to physical or virtual storage devices within a customer's network to receive storage network monitoring data in return. The storage network monitoring data captured by the Storage Resource Manager software module can include available/unused storage capacity, total storage capacity, input-output per second measurements, data latency, and throughput.

Network monitoring data is also captured through the Secure Remote Monitoring and Management software platform. The SRM2 software platform generally processes the function status network monitoring data, or "Business Critical Services data," which is the enriched network monitoring data captured by interfacing directly with particular customer software applications and end point devices. An example configuration for the SRM2 platform is shown in FIG. 4. The SRM2 Primary server and SRM2 Secondary server can be implemented as virtual servers running on the provider's core application servers. The SRM2 Primary server and SRM2 Secondary server are configured for High Availability with failover functionality where the primary (active) server periodically synchronizes with the secondary (passive) server. The SRM2 servers receive Business Critical Services data and other network monitoring data from the VSE Platform and pass the data to the reporting server through the SQL database cluster (not shown in FIG. 4) for display on the Dashboard GUIs.

The SRM2 system includes an SRM2 Application Monitor software application that is implemented by the Platinum 1 Functionality Module deployed within a customer's information technology network. As discussed above, the SRM2 Application Monitor software application captures Business Critical Services data by interfacing directly with particular software applications and end point devices on a customer's network, including, but not limited to: (i) Citrix® virtual desktop software; (ii) a customer's webserver that implement's the customer's website; (iii) printer devices; (iv) Dynamic Host Configuration Protocol ("DHCP") servers; (v) customer Exchange email servers; or (vi) medical imaging devices.

The SRM2 Application Monitor software application can interface with customer software applications and end point devices by emulating functions carried out by customer end users, like processing a DICOM image file by a medical imaging machine, sending an email through an Exchange server, or attempting to print a document through a printer. The SRM2 Application Monitor software application then captures status and performance data resulting from execution of these functions to provide enriched network monitoring data that provides deeper insight into the functioning of customer network resources beyond just determining whether a resource is online or offline.

The Data Aggregation Database software platform harvests or "pre-fetches" longer-term network monitoring data previously captured by the NMS platform and performs periodic data captures from certain software applications when the NMS platform is not configured to interface with a given software application. As shown in more detail below, the Dashboard GUIs are configured to display network monitoring metrics and information over varying time intervals. As an example, the Dashboard GUIs can display a current memory utilization as updated every fifteen minutes or as calculated over the last twenty-four hours, seven days, thirty days, or another selected time period. The Data Aggregation Database platform pre-fetches the longer-term monitoring metrics (e.g., over the last twenty-four hours, seven days, or thirty days) for display on the Dashboard GUIs. To promote efficiency, the longer-term monitoring metrics can be pre-fetched during off peak times, like after close of business or at night.

In another aspect of the system, the Data Aggregation Database software platform can also include APIs that are designed to interface with particular software applications for which the NMS software platform is not configured to access, which can include security-related software applications. The Data Aggregation Database software platform captures current network monitoring data from such software applications at periodic intervals, like every fifteen minutes. The Data Aggregation Database software platform periodically captures network monitoring data from software applications that include, but are not limited to, a customer's firewall, intrusion detection software, intrusion prevention software, log management software, and the National Vulnerability Database, which is a United State government database of cybersecurity vulnerability management data that can be utilized to automate vulnerability management.

In one embodiment, the Data Aggregation Database software environment includes a production environment and a staging environment for testing and validating new features to be integrated with a customer's information technology network. Both the production and the staging environments utilize an application server and a database server. Other features can be optionally implemented by the Data Aggregation Database environment, such as disaster recovery, automated backups, and system maintenance.

System Administration

The inventive systems disclosed herein include functions that facilitate the management and administration of end users who use the system and customization of the system interfaces and outputs. Management and administrative functions are generally accessed and controlled through an Administrative Console generated by an iDashboard software application that provides a management suite for the system.

With regard to end users, individual customer end users are provided with system named user accounts that are accessed using a username identifier and security credentials, such as a login password. Named user accounts can be established with customizable access restrictions so that end users are limited in their ability to access, view, or edit particular system software applications, virtual or physical computing devices, user interfaces, or metrics. User accounts can be created using the Administrator Console user interface to create a database record for the named user account that includes information such as the end user first and last name, end user identifier (e.g., a username), login credentials (e.g., a password), role, primary group, and contact information (e.g., email address, phone number, etc.). End users can be assigned to one or more Groups. The Groups are a collection of named user accounts having similar permissions to access certain permitted network monitoring metrics, software applications, nodes or end user devices.

The various system Dashboard GUIs can be customize according to customer preferences to display metrics selected by a customer that relate to customer specified nodes and software applications. The Dashboard GUIs are further customizable with respect to the layout of particular graphics, data fields, and functions and customizable with respect to the type of alerts displayed to an end user and the threshold for generating such alerts. The Dashboard GUI display settings are accessible through the Administrative Console user interface.

Each customer is generally provided with features that include the following Categories: (i) Ecosystem Overview; (ii) Network Summary; (iii) Application Summary; (iv) Compute Node Summary; (v) Security Summary; and (vi) Reporting. The Categories are used to define the Dashboard GUI menus, functions, and displayed network monitoring data.

The iDashboard Administrative Console also provides access for provider or customer end users having administrative access permissions to modify various system settings. Examples categories of system settings can include, but are not limited to: (i) User Application Settings; (ii) Server Settings; (iii) Security Settings; (iv) Report Settings; and (v) Database Settings.

The User Application Settings category provides parameters that control the behavior and display of the Dashboard GUIs for particular end users or Groups of end users. A list of example User Application Settings that can be made available is shown in FIG. 4 and can include, for example: (i) Default Date/Time Format to set the format of the date displayed to an end user; (ii) Prevent Session Timeout to disable the feature whereby end users are logged out of the system after a period of inactivity; (iii) Session Timeout (minutes) to control the duration of time that elapses before an end user is automatically logged out of the system; or (v) other useful settings known to one of skill in the art.

System Dashboard Graphical User Interfaces

End users access the monitoring system by first entering authentication credentials into a Login GUI. The example interfaces depicted in the attached figures are implemented as web-based interfaces that can be displayed through an Internet Browsing software application running on an end user's computing device. End users can, therefore, access the Login GUI by utilizing the Internet Browser software application navigation functions. Once an end user authenticates into the system, the system presents the end user with a main landing webpage, or homepage user interface. In the embodiment depicted in the attached figures, the main landing webpage is set as one of the Dashboard GUIs, such as the Ecosystem Overview Dashboard GUI.

Figure 5:
FIG. 5 is an example menu bar for selecting display of a dashboard graphical user interface.

The main landing webpage and/or one or more of the Dashboard GUIs can optionally display a menu bar, such as the menu bar shown in FIG. 5, that includes functions for navigating between the various Dashboard GUIs. As an example, end users select the Ecosystem Overview function to display the Ecosystem Overview Dashboard GUI or the Network function to display the Network Dashboard GUI.

The Dashboard GUIs are generated by the dashboard server based on network monitoring data and network monitoring metrics received from the reporting server. Each of the Dashboard GUIs is updated, or periodically refreshed, according to provider, customer, or end user defined preferences, such as specifying the refresh time interval as well as the particular network monitoring metrics that are updated. In one embodiment, the Dashboard GUIs are refreshed every fifteen minutes to provide near real-time network monitoring metric information. The network monitoring metrics can also be displayed as "durational network monitoring metrics" that are measured over longer time intervals (e.g., as measured over the last twenty-four hours, seven days, or thirty days). In the embodiment depicted in the attached figures, the Dashboard GUIs display the most recent metric value, as updated every fifteen minutes, in rectangular areas that include a label for the network monitoring metric. The longer-term, or durational network monitoring metrics are generally displayed with a label indicating the time interval (e.g., Last 24 Hours, Last 7 Days, or Last 30 Days).

The periodically updated network monitoring metric information has the advantage of allowing customers to make expedient, informed, and accurate decisions concerning business operations and to diagnose and resolve problems. Providing a view into the network monitoring metrics over longer time intervals has the advantage of allowing customers to gain insight into how the metrics are changing over time and whether current metric values are deviating from typical values observed. This in turn permits more effective management of information technology network resources and better informs decisions about budgeting and network design, among other issues. For example, if a customer is experiencing a particular problem with memory or storage utilization, a constant utilization percentage over time might indicate that the installation of additional memory or storage devices is not necessary given that demand is relatively stable. Instead, the customer may conclude that reallocation of current resources is a more efficient resolution to observed memory or storage availability limitations.

Figure 6:
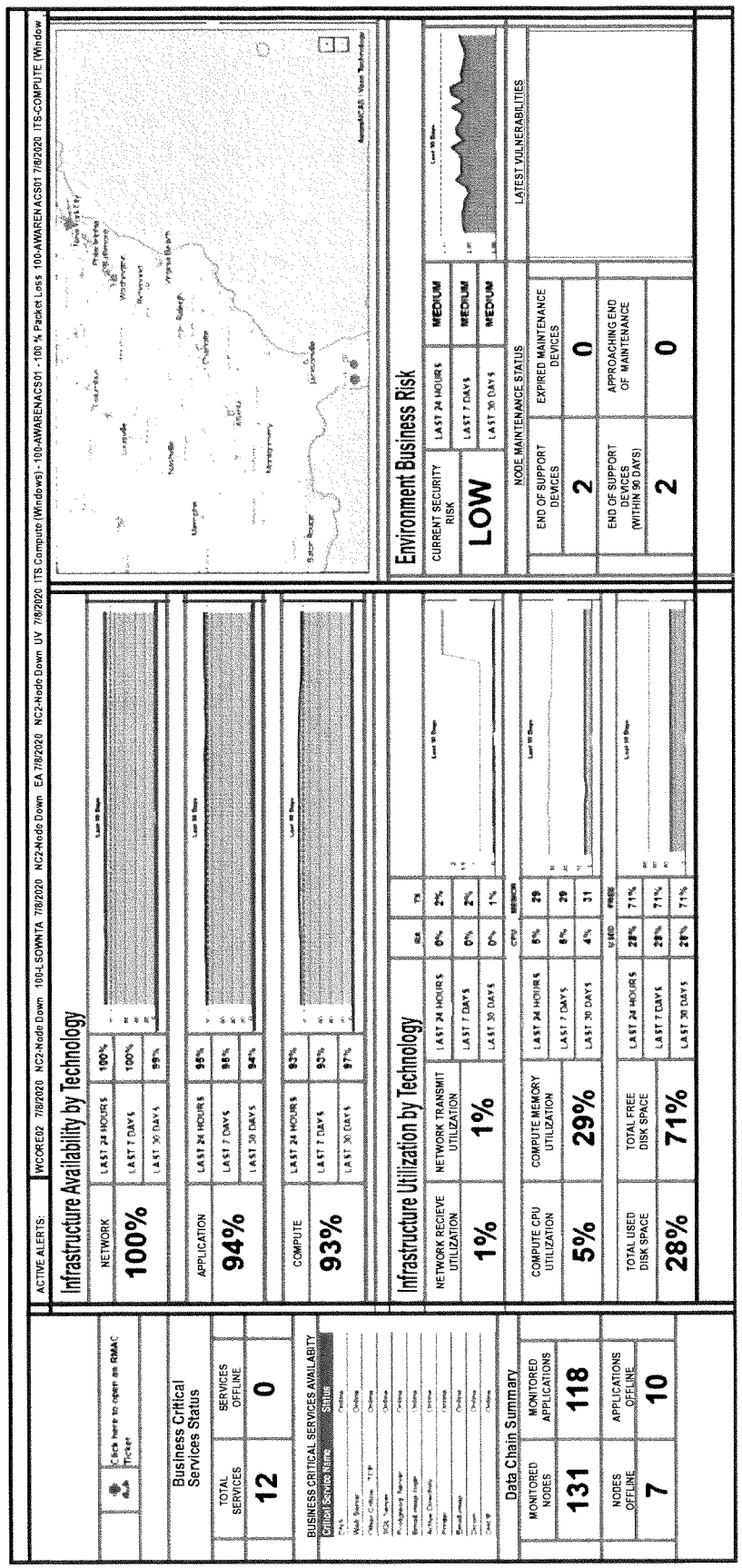
FIG. 6 illustrates an example Ecosystem Overview Dashboard graphical user interface.

Turning to FIG. 6, the embodiment depicted in the attached figures utilizes the Ecosystem Overview Dashboard GUI as the main landing webpage. The Ecosystem Overview Dashboard GUI is divided into six sections: (i) Business Critical Services Status; (ii) Data Chain Summary; (iii) Infrastructure Availability by Technology; (iv) Infrastructure Utilization by Technology; (v) Environment Business Risk; and (vi) a Node Map section. Each section displays average metrics for all nodes, interfaces, and applications for a given customer.

The Business Critical Services Status section displays metrics relating to various customer information technology network digital resources that are important to a customer's business operations. The Business Critical Services Status section is customizable in that it can be configured to display customer-selected network monitoring metrics relating to network resources that a customer designates for monitoring. The network monitoring metrics reflect the availability and functionality of system resources so that a customer can quickly and conveniently gain insight into whether a particular customer resource or facility is operational and able to meet the customer's operational demands.

In the example embodiment shown in FIG. 6, the Business Critical Services Status section displays network monitoring metrics and information that include: (i) the total number of services available; (ii) the number of services that are offline; and (iii) the name of the services being monitored and the status of each software service as being online, derogated, or offline. The monitored services can include a combination of monitored software applications and computing devices utilized by a customer, such as a Domain Name Service, a Web Server, or a SQL Server. The Business Critical Services Status section also displays Data Chain Summary metrics that provide a total view of the services, software applications, and nodes that are being monitored and includes metrics such as: (i) the total number of monitored nodes; (ii) the number of monitored software applications; (iii) the number of nodes that are offline; and (iv) the number of software applications that are offline.

The Ecosystem Overview Dashboard GUI also includes an Infrastructure Availability by Technology section that displays availability network monitoring metrics as updated every fifteen minutes and calculated over specified time intervals, such as the last twenty-four hours, seven days, and thirty days. The example availability network monitoring metrics shown in FIG. 6 are displayed as percentages of customer network digital resources available over a given time frame, as determined from operational status data reported with the availability network monitoring data, and the availability network monitoring metrics can include: (i) Network—a percentage of all customer network nodes that are available for use over a given time period; (ii) Application—a percentage of the customer's software applications that are available over a given time period; and (iii) Compute—a percentage of the customer's compute nodes that are available for use over a given time period. Each of the availability network monitoring metrics is displayed as updated every fifteen minutes and as durational network monitoring metrics calculated over the last twenty-four hours, seven days, and thirty days. The availability network monitoring metrics can be displayed across all devices in a customer's network, or a particular subset of devices can be selected for monitoring with respect to resource availability. The availability network monitoring metrics can also be displayed in a graphical format as a function of time to provide insight into how the availability network monitoring metrics change over a given time period.

The availability network monitoring metrics can be calculated, for example, by tallying the number of customer network digital resources that report a status of online and dividing by the number of customer network digital resources that are potentially available but not online, as determined from network inventory data stored to a digital resource inventory relational database. The availability network monitoring data is gathered from the NMS platform at fifteen (15) minute intervals. The longer-term twenty-four hour, seven day, and thirty day durational availability network monitoring data is gathered by direct queries from the Data Aggregation Database software platform. To enhance system efficiency, the durational availability data can be captured once per day during non-peak system utilization times (e.g., at night or after close of business) and stored in a pre-summarized format for faster query return and display.

The Infrastructure Utilization by Technology section displays network monitoring metrics that represent the overall percentage of customer network resources utilized over a given time period. Network utilization network monitoring metrics include: (i) Network Receive Utilization representing the portion of incoming data bandwidth utilized over a given time period; (ii) Network Transmit Utilization representing the portion of outgoing data bandwidth utilized over a given time period; (iii) Compute CPU Utilization representing the percentage of available compute node processing capacity utilized over a given time period; (iv) Compute Memory Utilization representing the percentage of available compute node transitory memory capacity utilized over a given time period; (v) Total Used Disk Space used representing the percentage of available non-transitory storage utilized by a customer network over a given time period; and (vi) Total Free Disk space representing the percentage of non-transitory storage available for use by a customer network over a given time period.

The utilization network monitoring metrics are displayed as updated every fifteen minutes and as determined over specified time periods, like the last twenty-four hours, seven days, and thirty days. The utilization network monitoring metrics can also be displayed in a graphical format as a function of time. The network monitoring data used to calculate the utilization network monitoring metrics is captured by the NMS platform at fifteen intervals. The longer-term twenty-four hour, seven day, and thirty day utilization data is gathered by direct queries to the Data Aggregation Database software platform. To enhance system efficiency, the longer-term utilization network monitoring data can be captured once per day during non-peak system utilization times (e.g., at night) and stored in a pre-summarized format for faster query return and display.

The Environmental Business Risk section of the Ecosystem Overview Dashboard GUI shown in FIG. 6 displays a Current Security Risk network monitoring metric that represents a qualitative assessment of security risk (e.g., low, medium, or high risk) for the last fifteen minutes, twenty-four hours, seven days, and thirty days. The Current Security Risk network monitoring metric can also be displayed in a graphical format to illustrate how the security risk has changed over time. The Current Security Risk network monitoring metric is determined from network monitoring data pulled from the NMS platform, a customer's firewall, or the firewall Functionality Module integrated with the VSE Platform shown in FIG. 2. The Current Security Risk network monitoring metric can be determined by considering information that includes, but is not limited to: (i) the number of blocked attempts to access a customer's information technology network; (ii) whether any instances of attempted access to a customer's information technology network involved attempted access to software applications or computing devices with known vulnerabilities or software applications that are deemed critical to a customer's operations; (iii) whether customer end users are observed utilizing particular applications or websites known to present a security risk; or (iv) any other relevant factor known to one of skill in the art as being relevant to network security.

The Latest Vulnerabilities subsection of the Environmental Business Risk section shown in FIG. 6 is configured to display a narrative description of security vulnerabilities published in the United States National Vulnerability Database. In the embodiment shown in the attached figures, the Latest Vulnerabilities information is captured by the Data Aggregation Database software platform before being transmitted to the provider core application server and eventually to the dashboard server for display on the Dashboard GUIs.

Node Maintenance Status metrics are also provided based at least in part on maintenance and support data received from the NMS platform and includes network monitoring metrics such as: (i) End of Support Devices indicating the number of nodes and/or end user devices in a customer network that no longer qualify for technical support or security updates; (ii) End of Support Devices (Within 90 Days) indicating the number of nodes and/or end user devices in a customer network that, within the next 90 days, will no longer qualify for technical support or security updates; (iii) Expired Maintenance Devices indicating the nodes and/or customer end user devices in a customer network that have reached the end of the device's maintenance cycle; and (iv) Approaching End of Maintenance indicating the nodes and/or customer end user devices in a customer network that are approaching the end of the device's maintenance cycle.

In one embodiment, the Node Maintenance Status metrics are determined by first capturing identification and configuration data from a digital resource, such as a network or compute node's manufacturer, model number, and/or serial number. If a node is configured to utilize the SNMP protocol, the identification and configuration data can be captured from the node's MIB database by sending a get request to the node, which causes the node to return identification and configuration data. The node identification and configuration data is used to look up maintenance and support data from a database or used by an API to interface with a third-party software application or database that can provide the maintenance and support data. The maintenance and support data is used to determine maintenance and support metrics, such as those shown in the Node Maintenance Status section of FIG. 6.

The maintenance and support metrics find multiple uses in facilitating effective information technology network management. For one, network digital resources that have extended beyond a manufacturer support period can present a security risk if the manufacturer is no longer providing software updates to protect against new vulnerabilities or types of malware or other attacks. A customer may, therefore, desire to renew a software maintenance contract to receive software updates or replace the particular network digital resource. The maintenance and support metrics can also be useful from a budgeting perspective if it is determined that particular network digital resources will need to be replaced in the near future.

The Ecosystem Overview Dashboard GUI Node Map section provides a visual representation of the status and geographic location of customer nodes, facilities, or end user devices. Operational status network monitoring metrics are indicated by color where, for example, an offline node is shown in red, an operational node is shown in green, and a node that is not being managed is shown in blue. The operational status network monitoring metrics are determined from status or availability network monitoring data received through the NMS platform. In one embodiment, the Node Map can be configured to display weather information or third party communication network outage information if, for instance, a particular communications provider or Internet Service Provider ("ISP") is experiencing a network outage that could impact a customer's information technology network. The system can incorporate one or more APIs configured to capture weather or communication network information from various public or private sources, such as capturing weather information from a National Weather Service database or capturing communication network information from a Federal Communication Commission ("FCC") or private ISP database.

The Node Map is generated from map data stored to a Map Tile Server that functions as a host for electronic map image files used to construct a geographical map at various zoom levels or scales. The Map Tile Server also creates the map image files with relational, node, and routing data from an object-relational database that is populated from a world file in the Protocol buffer Binary Format ("PBF") format and is updated hourly. The Node Map is configured to automatically adjust the location shown and the zoom level or scale to better focus on the particular locations of a customer's monitored nodes and facilities.

The Ecosystem Overview Dashboard GUI can optionally include a help desk support request feature available by selecting the Open a RMAC Ticket function on FIG. 6 to open the RMAC Submission Form user interface shown in FIG. 7. The RMAC Submission Form can be configured to open as a separate window or as a web-based interface within an Internet browser software application running on the end user's computing device. The end user enters information into the RMAC Submission Form such as the end user name, contact information, and a narrative description of the support request before selecting the Submit function to transmit the support request to the provider.

The top of the Ecosystem Overview Dashboard GUI shown in FIG. 6 includes an Active Alerts banner displaying alert data received from the NMS platform. The alert data can be represented with scrolling text that includes the alert date, a descriptive alert name, and the identity of the node or application associated with the alert. The alert data can be configured to represent a variety of conditions and alert thresholds, such generating an alert when a node or software application transitions from operational to offline or when a security breach is detected behind a customer's firewall.

Figure 8:
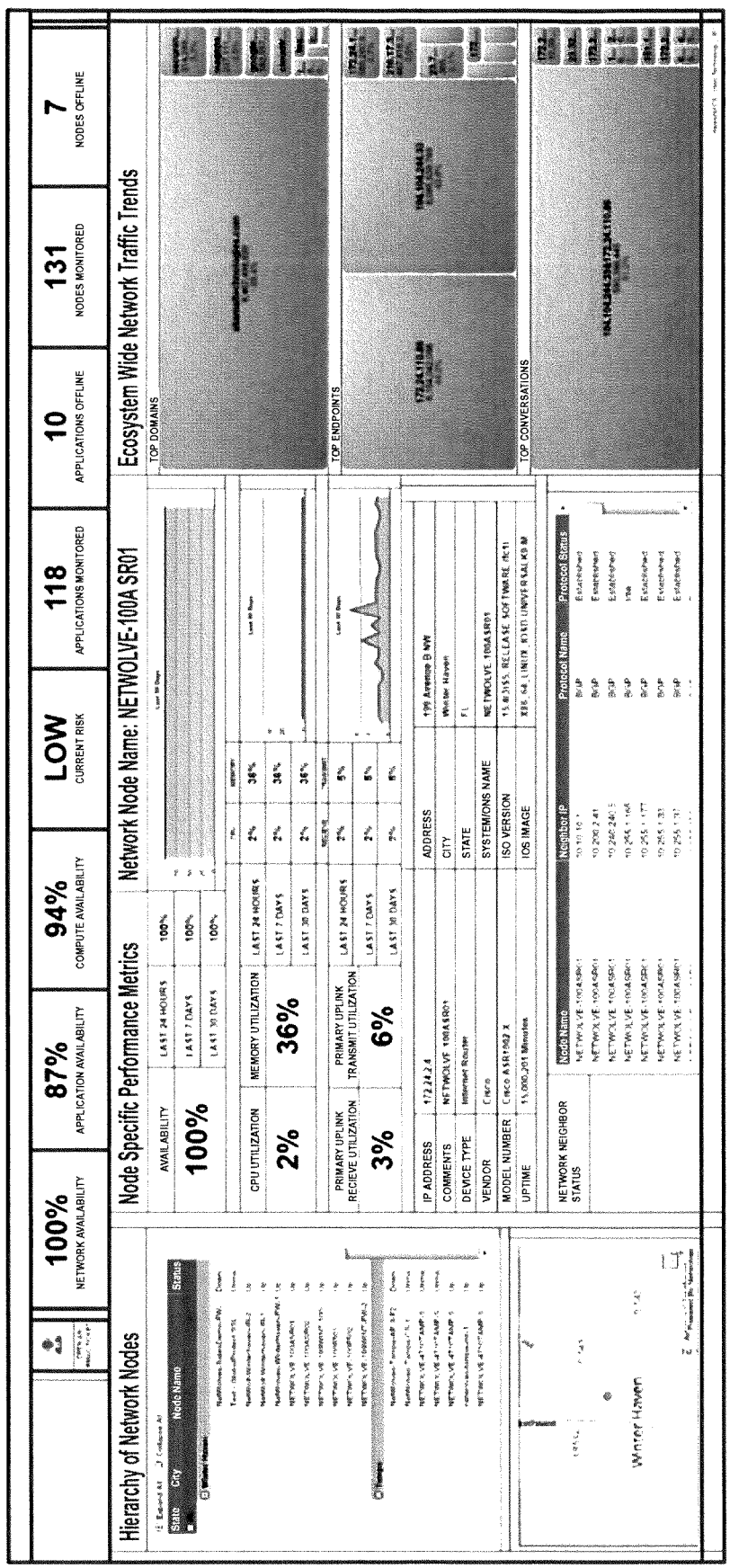
FIG. 8 illustrates an example Network Node Summary Dashboard graphical user interface dashboard.

Selecting the Network function on the menu bar of FIG. 5 and selecting the Summary function from the resulting pull down menu opens the Network Node Summary Dashboard GUI illustrated in FIG. 8 that displays information relating to customer network nodes. To display information relating to a particular network node, a customer network node is selected from the Hierarchy of Network Nodes panel on the left of the Dashboard GUI, which provides an inventory list of network node names, node locations, and node status data, as captured from the NMS platform. Upon selection of a network node, the Network Node Summary Dashboard GUI provides a range of network monitoring metrics and other information associated with the selected network node.

The Network Node Map section of the Network Node Summary Dashboard GUI graphically illustrates the geographic location of the network node that is selected in the Hierarchy of Network Nodes panel. The node operational status is indicated by color with offline nodes shown in red, operational nodes shown in green, and unmanaged nodes shown in blue. The location and status data for the network nodes displayed on the Network Node Map is received from the NMS platform.

The Node Specific Performance Metrics section displays availability and utilization network monitoring metrics for the nodes selected in the Hierarchy of Network Nodes section. The availability and utilization network monitoring metrics are updated every fifteen minutes and determined for various time intervals, including the last twenty-four hours, seven days, and thirty days. The availability and utilization network monitoring metrics are updated every fifteen minutes through network monitoring data captured by the NMS platform. The durational network monitoring metrics are pulled from a database within the Data Aggregation Database software platform.

The availability and utilization network monitoring metrics that are displayed in the Node Specific Performance Metrics section can include, but are not limited to: (i) Availability representing the percentage of time the selected node has been in an operational state over a given time period; (ii) CPU Utilization representing the percentage of available processing capacity utilized by the selected node over a given time period; (iii) Memory Utilization representing the percentage of available transitory memory utilized by the node over a given time period; (iv) Primary Uplink Receive Utilization representing the percentage of available incoming data bandwidth utilized by the node over a given time period for a link between the node subnetwork and a larger network (e.g., a customer's Wide Area Network or the Internet); and (v) Primary Uplink Transmit Utilization representing the percentage of available transmitted data bandwidth utilized by the node over a given time period for a link between the node subnetwork and a larger network. The performance metrics can also be displayed graphically to better illustrate how the metric values change over time.

In addition to performance statistics, the Network Node Summary Dashboard GUI can also be configured to display information about the characteristics of the selected node, including, but not limited to: (i) the node IP address; (ii) a node name or identifier; (iii) notes or comments about the node input by end users; (iv) the type of device (e.g., router, switch, hub, etc.); (v) the manufacturer of the node; (vi) the total uptime for the node since it was placed in service; (vii) the location of the node (e.g., physical mailing address or geographic coordinates); and (viii) information that identifies the software or firmware installed on the node.

The Network Node Summary Dashboard GUI can further be configured to display information relating to the surrounding network nodes shown in the Network Neighbor Status section of FIG. 8. This is particularly useful for network nodes that operate as layer 3 devices (i.e., the Network Layer), which can route traffic within a subnetwork and between subnetworks such that the node may be connected to other network nodes and devices. The Network Neighbor Status section displays information that includes the name, IP address, status, and routing protocols used for surrounding network nodes. This information can be useful for trouble shooting potential problems, such as ascertaining whether an increase in utilization metrics for a selected node could be the result of a failure in a node within the same subnetwork thereby requiring the diversion of network traffic to the selected node.

The Ecosystem Wide Network Traffic Trends section of the Network Node Summary Dashboard GUI includes network traffic monitoring metrics, as determined from the network flow data, for a customer's entire monitored information technology network. The network traffic monitoring metrics displayed in the Ecosystem Wide Network Traffic Trends section can include: (i) Top Domains representing the external domains that are most often accessed by digital resources within a customer's network over a given time period (e.g., "www.google.com"); (ii) Top Endpoints representing the end point devices in a customer's network that consume the most bandwidth over a given time period; and (iii) Top Conversations representing the pairs of computing devices that consume the most bandwidth after establishing a communication session.

The relative volumes of traffic can be depicted graphically through variations in the size of the display elements in the Ecosystem Wide Network Traffic Trends section. For example, a Top Domain receiving 10% of a customer's network traffic will be displayed using an element that is twice the size of an element depicting a Top Domain that received 5% of a customer's network traffic. The display elements within the Ecosystem Wide Network Traffic Trends section can additionally display data such as: (i) the Universal Resource Locator ("URL") of the Top Domains; (ii) the IP addresses for Top End Points and Top Conversations; (iii) the volume of data directed to the Top Domains, Top Endpoints, and Top Conversations; and (iv) the percentage of a customer's network traffic drawn by the Top Domains, Top Endpoints, and Top Conversations.

The Network Node Summary Dashboard GUI shown in FIG. 8 further includes a Top Metric Bar that provides a snap shot of significant monitoring metrics that are displayed across the Dashboard GUI pages. The metrics displayed by the Top Metric Bar are updated every fifteen minutes and include, for example: (i) Network Availability representing the percentage of customer network nodes that have an operational status of online; (ii) Application Availability representing the percentage of customer software applications that have an operational status of online; (iii) Compute Availability representing the percentage of customer compute notes that have an operational status of up or online; (iv) Current Security Risk representing a qualitative assessment of the network security status; (v) Applications Monitored representing the number of software applications currently being monitored; (vi) Applications Offline representing the number of customer software applications currently reporting a status of offline; (vii) Nodes Monitored representing the number of network and/or compute nodes currently being monitored; and (viii) Nodes Offline representing the number of network and/or compute nodes reporting a status of offline. The Top Metric Bar can also include a support request function shown as the "Open RMAC Ticket" link, which opens the RMAC Submission Form user interface shown in FIG. 7. The Top Metric Bar can be optionally integrated with any of the Dashboard GUIs using an in-line frame element that allows an external source to be embedded inside the Dashboard GUI.

Figure 9:
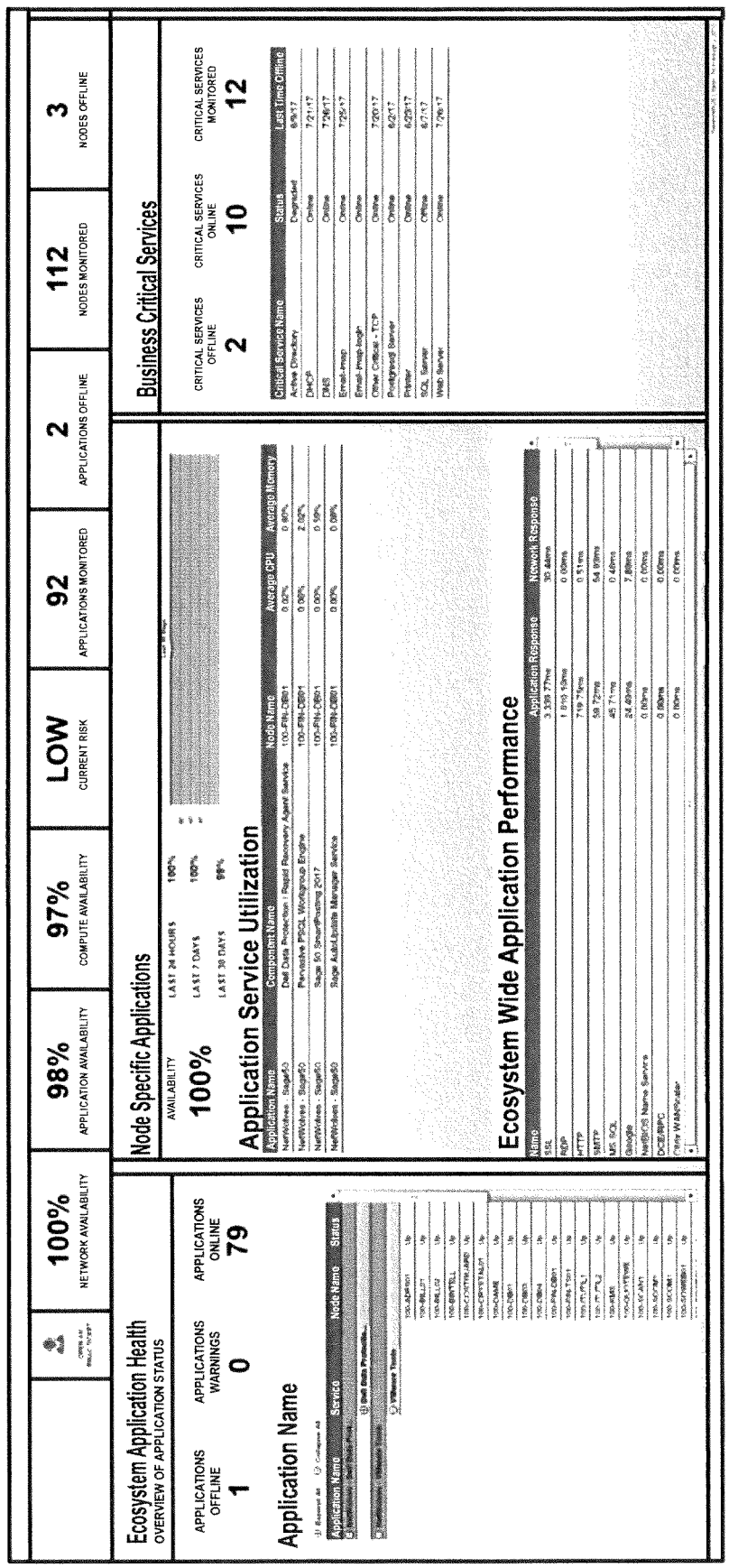
FIG. 9 illustrates an example Application Summary Dashboard graphical user interface.

Turning to FIG. 9, the Application Summary Dashboard GUI shows details concerning the status and performance of software applications within a customer's information technology network, such as network monitoring metrics relating to software application outages, warnings, availability, and utilization. The example Application Summary Dashboard GUI shown in FIG. 10 incorporates six display sections: (i) Ecosystem Application Health; (ii) Application Name; (iii) Node Specific Application; (iv) Application Service Utilization; (v) Ecosystem Wide Application Performance; and (vi) Business Critical Services.

Application Summary Dashboard GUI provides network monitoring metrics that relate to specific monitored software applications as well as network monitoring metrics that relate to the status and performance of all monitored software applications on a customer's network. The Ecosystem Application Health section displays overall monitored software application metrics such as: (i) Applications Offline representing the number of monitored software applications that currently report a status of offline; (ii) Application Warnings representing the number of monitored software applications that have reported a warning or an alert status; and (iii) Applications Online representing the number of monitored software applications that currently report a status of online. The Application Warnings can be triggered by a variety of conditions, such as a service, process, or other component of a software application reporting a status of being "down" or the software application reaching configurable alert thresholds for memory utilization, processing, or other conditions.

Metrics relating to specific monitored software applications can be display by selecting one or more software applications from the Application Name section of the Application Summary Dashboard GUI. The example Application Name section shown in FIG. 9 is displayed in a nested "tree" format such that the software applications are organized according to: (i) the identity or name of the software application; (ii) the identity of software services that are used by the software application; and (iii) an identifier or name of the node on which the software application is running. The Application Name section can also display information relating to the software application such as an operational status of the software applications (e.g., "up," "down," "online," "offline," etc.).

Selecting a specific software application within the Application Name section will display one or more availability and utilization network monitoring metrics related to the software application, such as an Availability network monitoring metric displayed as a percentage within the Node Specific Applications section of the Application Summary Dashboard GUI. The Availability represents a relative proportion of time over a given time period that the software application has reported an operational status of being "up" or "online." The Availability metric is updated every fifteen minutes with information received from the NMS platform. The value of the Availability network monitoring metric is also displayed as measured over various time intervals, such as the last twenty-four hours, seven days, and thirty days, as well as displayed in a graphical format as a function of time.

The Application Service Utilization section of the Application Summary Dashboard GUI displays information and data relating to a selected monitored software application that can include: (i) the software application name; (ii) a Component Name representing a service, process, or module that is running and used to support the selected software application operation; (iii) a Node Name representing an identity or name of the node where the selected software application is running; (iv) Average CPU representing the percentage of available processing resources utilized by the selected software application over a given time period; and (v) Average Memory representing the percentage of available transitory memory utilized by the selected application over a given time period. The Ecosystem Wide Application Performance section of the Application Summary Dashboard GUI displays performance network monitoring metrics relating to various software applications installed within a customer's network, including software application response times and network response times.

The Business Critical Services section of the Application Summary Dashboard GUI displays network monitoring metrics and information relating to customer software applications and services that a customer has designated for monitoring as being significant to business operations. The overall Business Critical metrics displayed can include, but are not limited to: (i) Critical Services Offline representing the number of software applications that currently report a status of offline; (ii) Critical Services Online representing the number of software applications that currently report a status of online; and (iii) Critical Services Monitored that represents the overall number of software applications that have been selected for monitoring. The Business Critical Services section is also configured to display data and information relating to specific software applications or services, such as: (i) the software application or service name; (ii) a status of the software application or service (e.g., online, offline, degraded, etc.); and (iii) a date representing the last time that a software application or service was offline.

Figure 10:
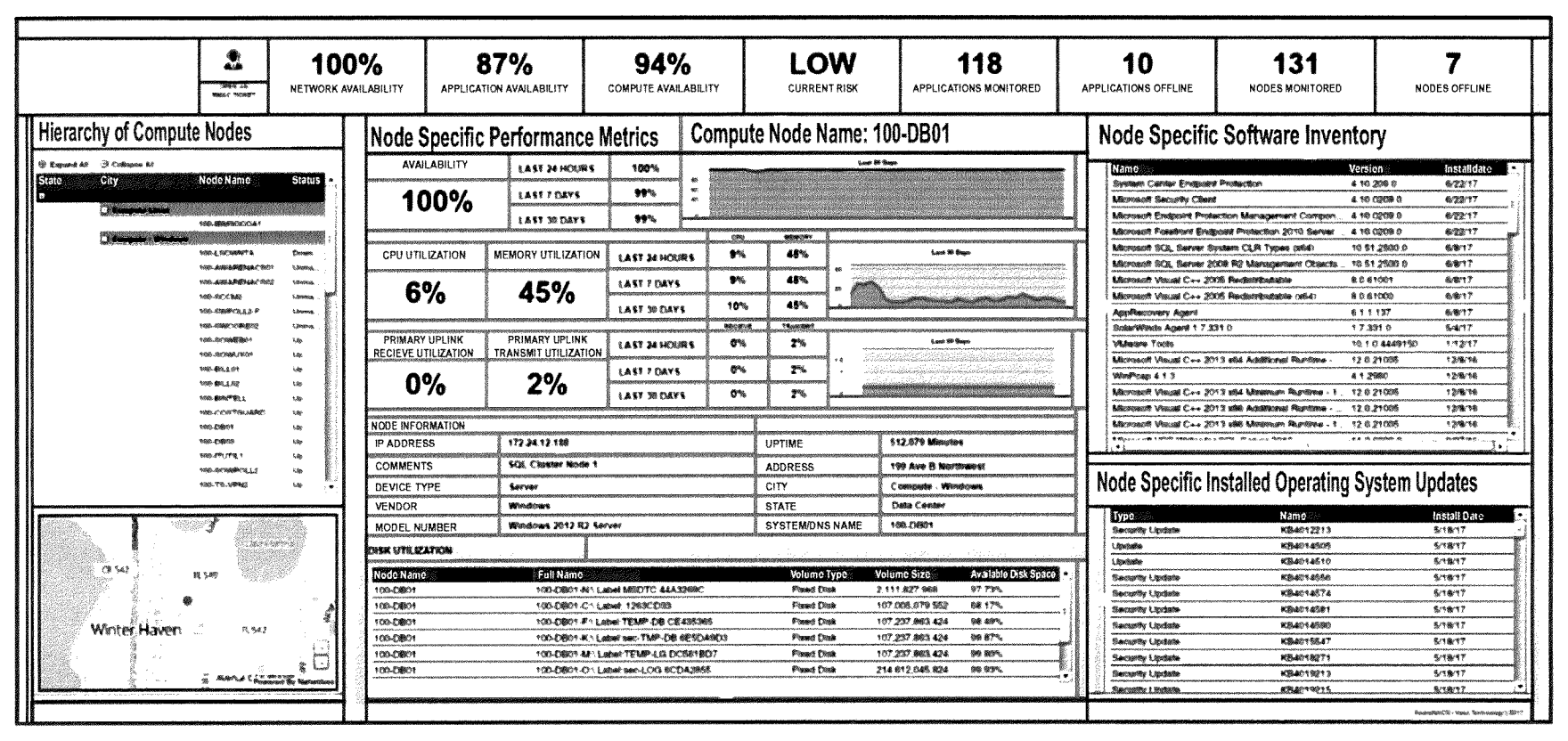

The Compute Node Summary Dashboard GUI shown in FIG. 10 can be accessed by selecting the Compute function from the menu bar shown in FIG. 5 and then selecting the Summary function on the resulting pulldown menu. The Compute Summary Dashboard GUI displays information that includes a full list of compute nodes, a node map of compute nodes, compute node specific performance network monitoring metrics, an inventory of specific installed applications, and operating system updates. The example Compute Summary Dashboard GUI shown in FIG. 11 includes five sections: (i) Hierarchy of Compute Nodes; (ii) a Compute Node Map; (iii) Node Specific Performance Metrics; (iv) Node Specific Software Inventory; and (v) Node Specific Installed Operating System Updates.

The Hierarchy of Compute Nodes section displays an inventory of customer network compute node identifiers along with the node locations (e.g., city and state), and a node status (e.g., online, offline, etc.). The Compute Node Map section of the Compute Summary Dashboard GUI graphically illustrates the geographic location of the network node that is selected in the Hierarchy of Compute Network Nodes panel. The node status is indicated by color with offline compute nodes shown in red, operational compute nodes shown in green, and unmanaged compute nodes shown in blue. The location and status network monitoring data for the network nodes displayed on the Compute Node Map are pulled from the NMS platform.

The Node Specific Performance Metrics section of the Compute Summary Dashboard GUI displays availability and utilization network monitoring metrics for the compute nodes selected in the Hierarchy of Compute Nodes section, as updated every fifteen minutes and as measured within various time intervals, including the last twenty-four hours, seven days, and thirty days. The availability and utilization network monitoring metrics are updated every fifteen minutes through data pulled from the NMS platform. The durational availability and utilization metrics are received from the Data Aggregation Database software. The availability and utilization network monitoring metrics displayed in the Node Specific Performance Metrics section can include, but are not limited to: (i) Availability representing the percentage of time the compute node has been in an operational state over a given time period; (ii) CPU Utilization representing the percentage of available processing capacity utilized by the compute node over a given time period; (iii) Memory Utilization representing the percentage of available transitory memory utilized by the compute node over a given time period; (iv) Primary Uplink Receive Utilization representing the percentage of available incoming data bandwidth utilized by the compute node over a given time period for a link between the compute node subnetwork and a larger network (e.g., a customer's Wide Area Network or the Internet); and (v) Primary Uplink Transmit Utilization representing the percentage of available transmitted data bandwidth utilized by the compute node over a given time period for a link between the node subnetwork and a larger network. The performance metrics can also be displayed graphically to better illustrate how the metric values change over time.

In addition to availability and utilization network monitoring metrics, the Compute Node Summary Dashboard GUI can also be configured to display a range of information about the characteristics of the compute node selected in the Hierarchy of Compute Nodes section, including, but not limited to: (i) the compute node IP address; (ii) a compute node name or identifier; (iii) notes or comments about the compute node input by end users; (iv) the type of device (e.g., router, switch, hub, etc.); (v) the manufacturer of the compute node; (vi) a model number for the compute; (vi) the total uptime for the compute node since it was placed in service; (vii) the location of the compute node (e.g., physical mailing address or geographic coordinates); and (viii) information that identifies the software or firmware installed on the compute node.

Storage or Disk Utilization network monitoring data can also be displayed to indicate the proportion of non-transitory storage utilized or available for a compute node selected in the Hierarchy of Compute Nodes section. The storage utilization network monitoring data can be captured from the storage monitor software module of the NMS platform. The example Compute Node Summary Dashboard GUI shown in FIG. 11 displays for each storage drive or disk volume associated with a compute node: (i) the compute node name or identifier; (ii) a name or identifier for the particular disk volume; (iii) the type of storage disk volume (e.g., physical fixed disk, a virtual drive, etc.); (iv) the size or overall amount of storage space of the disk volume; and (v) the percentage of storage space available for use on the disk volume.

For a compute node selected in the Hierarchy of Compute Nodes section, the Compute Node Summary Dashboard GUI is also configured to display an inventory of the software installed on the compute node under the Node Specific Software Inventory section. The Node Specific Software Inventory section can also show the version number for each installed software application as well as the date the software application was installed. To help customers ensure that the compute node is properly maintained and to assist in diagnosing problems with a compute node, a list of operating system software updates installed on the compute node and the date of installation are displayed in the Node Specific Installed Operating System Updates section.

Figure 11:
FIG. 11 illustrates an example Security Summary Dashboard graphical user interface.

Turning to FIG. 11, the Security Summary Dashboard GUI can be accessed by selecting the Security function from the menu bar shown in FIG. 5 and then selecting the Summary function on the resulting pulldown menu. The Security Summary Dashboard GUI displays security network monitoring data and information that provides insight into the overall security posture and risks to the customer's network. The example Security Summary Dashboard GUI includes four sections: (i) Potential Hazards; (ii) Potentially Hazardous Users; (iii) Identified Correlated Threats; and (iv) Active Security Threats.

The security network monitoring metrics displayed in the Potential Hazards section of the Security Summary Dashboard include: (i) Current Security Risk representing a qualitative assessment of security risk (e.g., low, medium, or high risk); (ii) Blocked Attacks indicating the number of security threats that were detected and blocked where the firewall or other security software recognized a fingerprint or signature for a security threat; and (iii) Detected Zero Day Threats representing the number of previously unknown vulnerabilities or threats detected where the firewall or other security software did not recognize a fingerprint for the threat but recognized suspicious activity, such as large data transfers or repeated attempts to access a customer's network in a short time period. The security network monitoring metrics displayed in the Potential Hazards section are updated every fifteen minutes, and the values of the metrics are shown as determined over multiple time periods, such as the last twenty-four hours, seven days, and thirty days. The security network monitoring metrics are also displayed graphically as a function of time to illustrate how the value of each metric varies over a given time period.

The Potentially Hazardous Users section displays security network monitoring metrics concerning customer end users and end user devices that are identified as posing a potential threat to network security. The end user security network monitoring metrics can be received from network firewall software and are determined by considering network monitoring data, such attempts by end user devices to access restricted external domains or large transfers of data by an end user device, among other factors. The end users and end user devices are classified according to the level of potential threat posed by the end user. For instance, the Potentially Hazardous Users section displays security network monitoring metrics that include: (i) High Potentially Hazardous End Users representing the overall number of end users classified as posing a high or elevated threat to customer network security; and (ii) Critical Potentially Hazardous Users representing the number of end users posing a potential critical threat to customer network security.

The Potentially Hazardous Users section can be further configured to display security network monitoring metrics and information relating to specific end users and end user devices, such as: (i) IP addresses for end user devices; (ii) software applications identified as presenting a potential security risk that are running on a customer end user computing device; and (iii) a risk level (e.g., High or Critical risk). If the VSE Platform deployed within a customer's network is configured to interface with a customer's active directory database, then the Potentially Hazardous Users section can also display end user identifiers, such as a customer network username.

The Identified Correlated Threats section of the Security Summary Dashboard GUI provides security network monitoring metrics and information that relate to security threats identified from an analysis of multiple layers of security network monitoring data using security information and event management techniques. For instance, the customer's firewall or other security software may report network monitoring data indicating that the same end point device attempted to access a restricted software application with a customer's network multiple times using different login credentials. By itself, a single attempted access may not be a recognized security threat. But the correlation of multiple access attempts through an analysis of historical security network monitoring data results in the recognition of a correlated threat even where the threat does not correspond to a known threat signature or fingerprint.

The Identified Correlated Threats section displays security network monitoring metrics that include a Historical Threats metric representing the overall number of historical or correlated threats detected. The Historical Threats security network monitoring metric is updated every fifteen minutes, and the value of the metric is displayed as determined over multiple time periods, including the last twenty-four hours, seven days, and thirty days. Security network monitoring metrics relating to specific identified threats is also displayed and includes: (i) an Offense Description representing a brief description of a particular threat; (ii) a Count representing the number of instances that a given threat was detected; (iii) a Destination representing the customer network node, facility, or geographic location where the threat was detected; and (iv) a Time of Offense representing the most recent date and/or time that a particular threat was detected.

The Active Security Threats section of the Security Summary Dashboard GUI displays security network monitoring metrics that include: (i) Detected Local Spyware Infections representing the number of spyware software installations (i.e., infections) detected within a customer's network over a given time period; (ii) Blocked Malware Instances representing the number of instances over a given time period where a customer's firewall or other security software recognized a malware signature and blocked the malware from accessing the customer's network; (iii) Attacked Victims representing the number of digital resources (e.g., end user computing devices, compute nodes, etc.) that were subject to a successful or attempted access or infection by malware over a given time period; and (iv) Blocked Websites representing the number of instances over a given time period that a customer digital resource was blocked from attempting to access a restricted website or domain.

With respect to the Blocked Malware Instances security network monitoring metric, the dashboard can also display an identifier for the recognized malware as well as a count representing the number of times each identified malware attempted to access the customer's network. And with respect to the Attacked Victims security network monitoring metric, the dashboard can also display: (i) an IP address for the digital resource attack victim; (ii) a count representing the number of attacks directed to a given IP address or attack victim; and (iii) a Category Threshold providing a general description of the nature of the malware attack (e.g., information leak, suspicious code execution, brute-force, etc.). Similarly, for the Blocked Websites security network monitoring metric, the dashboard can display a listing of the categories of domains or websites that were blocked (e.g., webmail, social network website, etc.), and a count representing the number of times access to a given category was blocked.

Those of skill in the art will appreciate that the Dashboard GUIs depicted in the attached figures are not intended to be limiting, and other types and categories of Dashboards can be created as part of the provider system. For example, in one embodiment, the network monitoring system also generates a Compute Storage Summary Dashboard GUI (not shown) that displays network monitoring metrics relating to storage and memory utilization across a customer's information technology network for all computing devices or a subset of computing devices (e.g., compute nodes). A Storage Summary Dashboard GUI could be configured to include sections such as: (i) Storage Capacity; (ii) Disk Performance; and (iii) Storage Inventory. As with the other dashboards, a Storage Summary Dashboard GUI can be configured to display current network monitoring metrics as updated every fifteen minutes and as determined over given time periods, such as over the last twenty-four hours, seven days, or thirty days.

Continuing with the foregoing example, a Storage Capacity section of a Storage Summary Dashboard GUI could be configured to display network monitoring metrics that include, but are not limited to: (i) Usable Storage representing a percentage of storage capacity on a customer network that considered "usable" where, for example, some storage is not usable because it is occupied by operating system software or other types of data that cannot be removed without impairing device function; (ii) Usable Available Disk Storage representing the number of bytes or volume of usable storage available; (iii) Usable Consumed Disk Storage representing the volume of usable storage that is being utilized by a customer's digital resources; or (iv) any other metric known to one of skill in the art as being relevant to evaluating a customer's network storage capacity and utilization.

A Storage Summary Dashboard GUI could also include a Disk Performance section that provides network monitoring metrics relevant to evaluating the performance of storage devices. A Disk Performance section could be configured to display disk performance network monitoring metrics such as: (i) Average Storage Latency representing an average time delay in accessing data from a storage device; (ii) Average Storage IOPS representing a measurement of the input/output operations per second performed by storage device; and (iii) Average Storage Throughput representing the average data rate to and from storage devices as typically measured in megabytes per second.

The Storage Summary Dashboard GUI can also include a Storage Inventory Section that provides storage network monitoring metrics concerning the number of storage devices, storage volumes (i.e., a logical division of storage space on one or more storage devices), and storage pools (i.e., collections of storage devices and volumes that can be configured for multi-tenant use). Storage network monitoring metrics displayed in a Storage Inventory Section can include, for example: (i) Total Storage Objects representing the number of storage devices on a customer's network; and (ii) Total Logical Unit Numbers ("LUNs")/Storage Pools representing the number of storage pools on a customer's network. The Storage Inventory Section can also display a Storage Inventory Chart that provides a list of storage devices on the customer network and includes storage network monitoring metrics such as: (i) an identifier for the storage device or volume; (ii) an identifier for any array or pool to which the storage device or volume is assigned; (iii) a type of storage device or volume; (iv) the storage capacity of the storage device or volume; (v) a latency measurement for each storage device or volume; (vi) an observed IOPS for each storage device or volume; and (vii) a throughput measurement for each storage device or volume.

In addition to providing Dashboard GUIs, the provider system can also make network monitoring data and metrics available through a reporting interface. The reporting interface can be configured to generate and display reports to provider or customer end users over a selected date and time range. The reports can be configured for display within an Internet browser software application integrated with a provider or a customer's end user computing device. Alternatively, the reports can be generated and configured for download to an end user computing device in a selected file format, such as a Portable Document Format ("PDF"), a comma-separated (".CSV") file format, or a spreadsheet format.

The reports can display, in a graphical or tabulated format, the network monitoring data that is used to generate the network monitoring metrics displayed on the Dashboard GUIs. Non-limiting examples of report types can include: (i) Network Node Inventory reports showing network node identifiers, locations, manufacturers, or other relevant information; (ii) Triggered Alerts showing a date an alert was observed, the node identifier that generated the alert, and a description of the alert; (iii) Network Packet Loss showning a percentage of packets lost by a network node over a given time period; (iv) Network Total Bytes Transferred showing the total volume of data received and transmitted by a network node over a given time period; (v) Network Hardware Sensor status providing information relating to hardware sensor outputs from network nodes, such as temperature sensors outputs or power supply outputs, which can be useful for diagnosing hardware level problems with network hardware resources; (vi) Application Availability showing percentage availability for monitored software applications and an identifier for the node on which the software application is running; (vii) Application CPU Utilization showing a percentage of available CPU utilization for monitored software applications and an identifier for the node on which the software application is running; (viii) Application Memory Utilization showing a percentage of available memory utilization for monitored software applications and associated software services and processes and an identifier for the node on which the software application is running; (ix) Application User Experience showing latency and network data transmission response times for software applications installed on a customer's network; (x) Business Critical Services showing an identifier and an operational status for selected software applications and services; (xi) Security Blocked Attacks showing an identifier for recognized malware that attempted to access the customer's network as well as a count of the number of times the malware attempted access to the network and the date of the last attempt; (xi) Security Correlated Threats showing a description of identified correlated threats; (xii) Security Blocked Malware showing an identifier for malware that was blocked from accessing the customer's network along with the date; (xiii) Security Blocked Websites showing the domain identifier for blocked attempts to access a restricted website or domain; (xiv) Security Attacked Victims showing IP addresses or other identifiers for digital resources subject to an attack along with an attack identifier, type of attack (e.g., information leak, brute force, etc.), the date of the last observed attack, and a count of the number of attacks attempted; (xv) Compute Node Availability showing an identifier, location, and availability percentage over a given time period for compute nodes on a customer's network; (xvi) Compute Node Disk Performance showing performance network monitoring metrics (e.g., latency, IOS, and throughput) for compute node storage devices; (xvii) Compute Node Disk Utilization showing network monitoring metrics related to compute node storage device utilization; and (xviii) Compute Node Total Bytes Transferred showing the overall volume of data received and transmitted by a Compute Node over a given time period.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for centralized monitoring of connected devices comprising:
   (a) a virtual service engine (VSE) Platform comprising at least one VSE Platform processor, the at least one VSE Platform processor coupled to a first data storage device comprising non-transitory computer-readable medium with computer-readable VSE Platform code for instructing the at least one VSE Platform processor, wherein
      (i) when the at least one VSE Platform processor executes the VSE Platform code, the at least one VSE Platform processor performs operations comprising
         (A) transmitting a network polling request message to one or more network nodes, wherein the network polling request message includes computer readable instructions that, when processed by the network nodes, causes the network nodes to transmit to the VSE Platform (I) utilization network monitoring data, and (II) availability network monitoring data that includes a network node operational status,
         (B) transmitting a compute polling request message to one or more compute nodes, wherein the compute polling request message includes computer-readable instructions that, when processed by the compute nodes, causes the compute nodes to transmit to the VSE Platform (I) utilization network monitoring data, and (II) availability network monitoring data that includes a compute node operational status,
         (C) transmitting an application polling request message to one or more monitored software applications, wherein the application polling request message includes computer-readable instructions that, when processed by the monitored software applications, causes the monitored software applications to transmit to the VSE Platform availability network monitoring data that includes an application operational status, and
         (D) implementing a Secure Remote Monitoring and Management (SRM2) Application Monitor software application configured to perform the operation of transmitting a business critical service function check message to a digital resource, wherein the business critical service function check message comprises a computer-readable instruction that is selected based on the digital resource, and when the instruction is executed by the digital resource, causes the digital resource to (A) perform a particular business service function, (B) generate Business Critical Service data comprising a digital resource identifier and a digital resource business service operational status, and (C) transmit the Business Critical Service data to the VSE Platform;
   (b) a dashboard server comprising a dashboard server processor coupled to a second data storage device comprising non-transitory computer-readable medium with computer-readable code for instructing the at least one dashboard server processor, wherein when the dashboard server processor executes the computer-readable code, the dashboard server processor performs operations comprising (A) generating an Ecosystem Overview Dashboard Graphical User Interface (GUI), (B) configuring the Ecosystem Overview Dashboard GUI for display by an end user computing device display screen, and (C) further configuring the Ecosystem Overview Dashboard GUI to simultaneously display within a single screen, a plurality of network monitoring metrics determined from the availability network monitoring data and the utilization network monitoring data, wherein the network monitoring metrics comprise
      (i) a network node availability network monitoring metric,
      (ii) a compute node availability network monitoring metric,
      (iii) a monitored software application availability network monitoring metric,
      (iv) a network node utilization network monitoring metric,
      (v) a compute node utilization network monitoring metric; and
      (vi) a Node Map that displays (A) a network node geographic location and the network node operational status for the one or more network nodes, or (B) a compute node geographic location and the compute node operational status for the one or more compute nodes, or (C) both the network node geographic location and the network node operational status for the one or more network nodes and the compute node geographic location and the compute node operational status for the one or more compute nodes; and wherein
   (c) the dashboard server processor performs the further operations of configuring the Ecosystem Overview Dashboard GUI to display at least one Business Critical Service metric determined from the Business Critical Service data, wherein the at least one Business Critical Service metric comprises (i) a digital resource identifier, and (ii) a digital resource business service operational status.

2. The system for centralized monitoring of connected devices of claim 1, wherein:
   (a) the VSE Platform processor is further configured to perform the operation comprising
      (i) transmitting a get request message to one or more digital resources, wherein the get request message includes computer-readable instructions that, when processed by the digital resource, causes the digital resource to transmit to the VSE Platform identification and configuration data, and
      (ii) querying a maintenance database using the identification and configuration data to retrieve maintenance and support data corresponding to the digital resource; and
   (b) the dashboard server processor performs the further operations of configuring the Ecosystem Overview Dashboard GUI to display at least one maintenance and support metric determined from the maintenance and support data.

3. The system for centralized monitoring of connected devices of claim 2, wherein the at least maintenance and support metric comprises: (a) an End of Support Devices metric; and (b) an Expired Maintenance Devices metric.

4. The system for centralized monitoring of connected devices of claim 1, wherein:
   (a) the at least one VSE Platform processor performs further operations comprising
      (i) determining a durational network node availability network monitoring metric based on the availability network monitoring data received by the VSE Platform in response to the transmitted network polling request message, (ii) determining a durational compute node availability network monitoring metric based on the availability network monitoring data received by the VSE Platform in response to the transmitted compute polling request message, (iii) determining a durational monitored application availability network monitoring metric based on the availability network monitoring data received by the VSE Platform in response to the transmitted application polling request message, (iv) determining a durational network node utilization network monitoring metric based on the utilization network monitoring data received by the VSE Platform in response to the transmitted network polling request message, and (v) determining a durational compute node utilization network monitoring metric based on the utilization network monitoring data received by the VSE Platform in response to the transmitted compute polling request message, (b) the dashboard server processor performs the further operations of configuring the Ecosystem Overview Dashboard GUI to additionally display within the single screen (i) the durational network node availability network monitoring metric, (ii) the durational compute node availability network monitoring metric, (iii) the durational monitored application availability network monitoring metric, (iv) the durational network node utilization network monitoring metric, and (v) the durational compute node utilization network monitoring metric.

5. The system for centralized monitoring of connected devices of claim 4, wherein:

(a) the at least one VSE Platform processor performs further operations comprising determining one or more durational network monitoring metrics calculated over a time period comprising at least one of the time periods comprising twenty-four hours, seven days, and thirty days, wherein the durational network monitoring metrics comprise (i) the durational network node availability network monitoring metric, (ii) the durational compute node availability network monitoring metric, (iii) the durational monitored application availability network monitoring metric, (iv) the durational network node utilization network monitoring metric, and (v) the durational compute node utilization network monitoring metric; and wherein (b) the dashboard server processor performs the further operations of configuring the Ecosystem Overview Dashboard GUI to additionally display within the single screen the one or more durational network monitoring metrics.

6. The system for centralized monitoring of connected devices of claim 1, wherein (a) the network node availability network monitoring metric comprises a percentage of network nodes for which the network node operational status indicates that the network node is functioning properly and available for use;

(b) the compute node availability network monitoring metric comprises a percentage of compute nodes for which the compute node operational status indicates that the compute node is functioning properly and available for use;

(c) the monitored software application availability network monitoring metric comprises a percentage of monitored software applications for which the application operational status indicates that the monitored software application is functioning properly and available for use;

(d) the network node utilization network monitoring metric comprises a percentage of received data bandwidth utilized and a percentage of transmission data bandwidth utilized; and (e) the compute node utilization network monitoring metric comprises (i) a percentage of CPU utilization, and (ii) a percentage of memory utilization.

7. A system for centralized monitoring of connected devices comprising:

(a) a virtual service engine (VSE) Platform comprising at least one VSE Platform processor, the at least one VSE Platform processor coupled to a first data storage device comprising non-transitory computer-readable medium with computer-readable VSE Platform code for instructing the at least one VSE Platform processor, wherein (i) when the at least one VSE Platform processor executes the VSE Platform code, the at least one VSE Platform processor performs operations comprising (A) transmitting a network polling request message to one or more network nodes, wherein the network polling request message includes computer readable instructions that, when processed by the network nodes, causes the network nodes to transmit to the VSE Platform (I) utilization network monitoring data, and (II) availability network monitoring data that includes a network node operational status, (B) transmitting a compute polling request message to one or more compute nodes, wherein the compute polling request message includes computer-readable instructions that, when processed by the compute nodes, causes the compute nodes to transmit to the VSE Platform (I) utilization network monitoring data, and (II) availability network monitoring data that includes a compute node operational status, (C) transmitting an application polling request message to one or more monitored software applications, wherein the application polling request message includes computer-readable instructions that, when processed by the monitored software applications, causes the monitored software applications to transmit to the VSE Platform availability network monitoring data that includes an application operational status, and wherein (ii) the VSE Platform code implements a Firewall Functionality Module that generates security network monitoring data;

(b) dashboard server comprising a dashboard server processor coupled to a second data storage device comprising non-transitory computer-readable medium with computer-readable code for instructing the at least one dashboard serverprocessor, wherein when the dashboard server processor executes the computer-readable code, the dashboard server processor performs operations comprising (A) generating an Ecosystem Overview Dashboard Graphical User Interface (GUI), (B) configuring the Ecosystem Overview Dashboard GUI for display by an end user computing device display screen, and (C) further configuring the Ecosystem Overview Dashboard GUI to simultaneously display within a single screen, a plurality of network monitoring metrics determined from the availability network monitoring data and the utilization network monitoring data, wherein the network monitoring metrics comprise
(i) a network node availability network monitoring metric,
(ii) a compute node availability network monitoring metric,
(iii) a monitored software application availability network monitoring metric,
(iv) a network node utilization network monitoring metric,
(v) a compute node utilization network monitoring metric; and
(vi) a Node Map that displays (A) a network node geographic location and the network node operational status for the one or more network nodes, or (B) a compute node geographic location and the compute node operational status for the one or more compute nodes, or (C) both the network node geographic location and the network node operational status for the one or more network nodes and the compute node geographic location and the compute node operational status for the one or more compute nodes; and wherein (c) the dashboard server processor performs the further operations of (A) generating an Security Summary Dashboard GUI, (B) configuring the Security Summary Dashboard GUI for display by an end user computing device display screen, and (C) further configuring the Security Summary Dashboard GUI to simultaneously display within a single screen, a plurality of security network monitoring metrics determined from the security network monitoring data, wherein the network monitoring metrics comprise
(i) a Current Security Risk network monitoring metric,
(ii) a Blocked Malware Instances network monitoring metric,
(iii) a Blocked Websites network monitoring metric, and
(iv) one or more Potential Hazardous Users network monitoring metrics.

8. A system for centralized monitoring of connected devices comprising:
(a) a virtual service engine (VSE) Platform comprising at least one VSE Platform processor, the at least one VSE Platform processor coupled to a first data storage device comprising non-transitory computer-readable medium with computer-readable VSE Platform code for instructing the at least one VSE Platform processor, wherein
(i) when the at least one VSE Platform processor executes the VSE Platform code, the at least one VSE Platform processor performs operations comprising
(A) transmitting a network polling request message to one or more network nodes, wherein the network polling request message includes computer readable instructions that, when processed by the network nodes, causes the network nodes to transmit to the VSE Platform (I) utilization network monitoring data, and (II) availability network monitoring data that includes a network node operational status,
(B) transmitting a compute polling request message to one or more compute nodes, wherein the compute polling request message includes computer-readable instructions that, when processed by the compute nodes, causes the compute nodes to transmit to the VSE Platform (I) utilization network monitoring data, and (II) availability network monitoring data that includes a compute node operational status, and
(C) transmitting an application polling request message to one or more monitored software applications, wherein the application polling request message includes computer-readable instructions that, when processed by the monitored software applications, causes the monitored software applications to transmit to the VSE Platform availability network monitoring data that includes an application operational status,
(D) determining from the availability network monitoring data and the utilization network monitoring data, the network monitoring metrics,
(E) establishing a secure data connection to the core application server, and
(F) transmitting the network monitoring metrics to the core application server through the secure connection;

(b) a dashboard server comprising a dashboard server processor coupled to a second data storage device comprising non-transitory computer-readable medium with computer-readable code for instructing the at least one dashboard server processor, wherein when the dashboard server processor executes the computer-readable code, the dashboard server processor performs operations comprising (A) generating an Ecosystem Overview Dashboard Graphical User Interface (GUI), (B) configuring the Ecosystem Overview Dashboard GUI for display by an end user computing device display screen, and (C) further configuring the Ecosystem Overview Dashboard GUI to simultaneously display within a single screen, a plurality of network monitoring metrics determined from the availability network monitoring data and the utilization network monitoring data, wherein the network monitoring metrics comprise
(i) a network node availability network monitoring metric,
(ii) a compute node availability network monitoring metric,
(iii) a monitored software application availability network monitoring metric,
(iv) a network node utilization network monitoring metric,
(v) a compute node utilization network monitoring metric, and
(vi) a Node Map that displays (A) a network node geographic location and the network node operational status for the one or more network nodes, or (B) a compute node geographic location and the compute node operational status for the one or more compute nodes, or (C) both the network node geographic location and the network node operational status for the one or more network nodes and the compute node geographic location and the compute node operational status for the one or more compute nodes (c) a core application server, wherein the core application server performs the operation of transmitting the network monitoring metrics to the database cluster for storage;

(d) a database cluster;

(e) a reporting server; wherein the reporting server performs operations comprising (i) receiving from the database cluster the network monitoring metrics, and (ii) transmitting to the dashboard server the network monitoring metrics.

9. A system for centralized monitoring of connected devices comprising (a) a digital resource inventory relational database comprising one or more database records that each comprise a digital resource identifier, wherein the one or more digital resources are monitored software applications;

(b) a virtual service engine, wherein (I) the virtual service engine performs operations comprising (i) transmitting a polling request message to one or more digital resources, wherein the polling request message includes computer-readable instructions that, when processed by the digital resources, causes the digital resources to transmit to the virtual service engine (A) utilization network monitoring data, and (B) availability network monitoring data that includes a digital resource operational status, (ii) determining one or more network monitoring metrics based on the availability network monitoring data and the utilization network monitoring data, wherein the network monitoring metrics comprise a digital resource availability network monitoring metric and a digital resource utilization network monitoring metric; and (iii) establishing a secure data connection to a provider computing environment comprising a provider server and transmitting the network monitoring metrics to the provider system through the secure data connection;

(II) wherein the virtual service engine comprises a Secure Remote Monitoring and Management (SRM2) Application Monitor software application configured to perform the operation of transmitting a business critical service function check message to a monitored software application, wherein the business critical service function check message comprises a computer-readable instruction that is selected based on the monitored software application, and when the instruction is executed by the monitored software application, causes the monitored software application to (A) perform a particular busines s service function, (B) generate Business Critical Service data, and (C) transmit the Business Critical Service data to the virtual service engine, and wherein (III) the virtual service engine comprises a Monitoring Engine software application that interfaces with the one or more monitored software applications to generate software application performance data; and (IV) the virtual service engine performs the further operation comprising transmitting the Business Critical Services data and the software application performance data to the provider system; and (c) a provider server that performs operations comprising (i) generating a Dashboard Graphical User Interface, (ii) configuring the Dashboard Graphical User Interface for display by an end user computing device display screen, and (iii) further configuring the Dashboard Graphical User Interface to simultaneously display within a single screen (A) the digital resource availability network monitoring metric, (B) the digital resource utilization network monitoring metric, and (C) a list of digital resource identifiers retrieved from the digital resource inventory relational database; and (iv) configuring the Dashboard Graphical User Interface to display (A) a Business Critical Services metric based on the Business Critical Services data, (B) at least one software application performance metric determined based on the software application performance data, and (C) an availability network monitoring metric and an utilization network monitoring metric for a given monitored software application when the given monitored software application is selected from the list of digital resources.

10. The system for centralized monitoring of connected devices of claim 9, wherein:

(a) the one or more digital resources are network nodes;

(b) the virtual service engine comprises a Platinum 1 Functionality Module that performs the operation comprising transmitting a netflow data request message to one or more network nodes, wherein the netflow data request message includes computer-readable instructions that, when processed by the network node, cause the network node to transmit network flow data to the Platinum 1 Functionality Module;

(c) the virtual service engine performs the further operation comprising (i) determining one or more network flow monitoring metrics based on the network flow data, and (ii) transmitting the one or more network flow monitoring metrics to the provider system; and (d) the provider server performs the further operations of configuring the Dashboard Graphical User Interface to display (i) the network flow data, (ii) a Node Map that displays a geographic location and the digital resource operational status for the one or more network nodes, and (iii) an availability network monitoring metric and an utilization network monitoring metric for a given network node, when the given network node is selected from the list of digital resource identifiers.

11. The system for centralized monitoring of connected devices of claim 9, wherein:

(a) the one or more digital resources are compute nodes;

(b) the virtual service engine is configured to perform the operations comprising transmitting a get request message to the one or more compute nodes, wherein the get request message includes computer-readable instructions that, when processed by compute nodes causes the compute nodes to transmit to the virtual service engine identification and configuration data, wherein the identification and configuration data comprises an identifier for at least one software application integrated with the one or more compute nodes;

(c) the provider server performs the further operations of configuring the Dashboard Graphical User Interface to display (i) a Node Map that displays a geographic location and the digital resource operational status for the one or more compute nodes, (ii) a list of identifiers for at least one software application integrated with the one or more compute nodes; and (iii) an availability network monitoring metric and an utilization network monitoring metric for a given compute node, when the given compute node is selected from the list of digital resource identifiers.

12. The system for centralized monitoring of connected devices of claim 9, wherein
 (a) the at least one software application performance metric comprises an application response time and a network response time; and
 (b) the Business Critical Services metric comprises a software application identifier and a monitored software application business service operational status.

13. The system for centralized monitoring of connected devices of claim 9, wherein:
 (a) the virtual service engine comprises a Storage Resource Module software application that performs the operation comprising transmitting a storage data request message to one or more storage resources, wherein the storage data request message includes computer-readable instructions that, when processed by the storage resources, cause the storage resources to transmit storage network monitoring data to the virtual service engine;
 (b) the virtual service engine performs the further operation comprising (i) determining one or more storage network monitoring metrics based on the storage network monitoring data, and (ii) transmitting the one or more storage network monitoring metrics to the provider system; and
 (c) the provider server performs the further operations of configuring the Dashboard Graphical User Interface to simultaneously display the storage network monitoring data within the single screen.

14. A method for centralized monitoring of connected devices comprising the steps of:
 (a) transmitting, by a network monitor software (NMS) Platform, a network polling request message to one or more network nodes, wherein the network polling request message includes computer-readable instructions that, when processed by the network nodes, causes the network nodes to transmit to the NMS Platform (i) utilization network monitoring data, and (ii) availability network monitoring data that includes a network node operational status;
 (b) transmitting, by the NMS Platform, a compute polling request message to one or more compute nodes, wherein the compute polling request message includes computer-readable instructions that, when processed by the compute nodes, causes the compute nodes to transmit to the NMS Platform (i) utilization network monitoring data, and (ii) availability network monitoring data that includes a compute node operational status;
 (c) transmitting, by the NMS Platform, an application polling request message to one or more monitored software applications, wherein the application polling request message includes computer-readable instructions that, when processed by the monitored software applications, causes the monitored software applications to transmit to the NMS Platform availability network monitoring data that includes an application operational status;
 (d) transmitting by a Secure Remote Monitoring and Management (SRM2) Application Monitor software application, a business critical service function check message to a digital resource, wherein the business critical service function check message comprises a computer-readable instruction that is selected based on the digital resource, and when the instruction is executed by the digital resource, causes the digital resource to (i) perform a particular business service function, (ii) generate Business Critical Service data comprising a digital resource identifier and a digital resource business service operational status, and (iii) transmit the Business Critical Service data to the SRM2 Application Monitor software application; and
 (e) generating by a dashboard server, a Dashboard Graphical User Interface;
 (f) configuring by the dashboard server, the Dashboard Graphical User Interface to simultaneously display, within a single screen, a plurality of network monitoring metrics determined from the availability network monitoring data and the utilization network monitoring data, wherein the network monitoring metrics comprise
  (i) one or more network node availability network monitoring metrics,
  (ii) one or more a compute node availability network monitoring metrics,
  (iii) one or more monitored software application availability network monitoring metrics, and
  (iv) at least one Business Critical Service metric determined from the Business Critical Service data, wherein the at least one Business Critical Service metric comprises (A) a digital resource identifier, and (B) a digital resource business service operational status.

15. The method of claim 14 further comprising the step of generating a Node Map that displays (A) a network node geographic location and the network node operational status for the one or more network nodes, or (B) a compute node geographic location and the compute node operational status for the one or more compute nodes, or (C) both the network node geographic location and the network node operational status for the one or more network nodes and the compute node geographic location and the compute node operational status for the one or more compute nodes.

16. The method of claim 15 further comprising the steps of:
 (a) generating by a Firewall Functionality Module, security network monitoring data through an analysis of network traffic data; and
 (b) configuring by the dashboard server, the Dashboard Graphical User Interface to display at least one security network monitoring metric determined from the security network monitoring data.

17. The method of claim 14 further comprising the steps of:
 (a) transmitting by a Platinum 1 Functionality Module, a netflow data request message to one or more network nodes, wherein the netflow data request message includes computer-readable instructions that, when processed by the network node, cause the network node to transmit network flow data to the Platinum 1 Functionality Module; and
 (b) configuring by the dashboard server, the Dashboard Graphical User Interface to display at least one network flow metric determined from the network flow data.

* * * * *